(12) United States Patent
Schaefer

(10) Patent No.: US 10,264,193 B2
(45) Date of Patent: Apr. 16, 2019

(54) SYSTEM AND METHOD FOR PROVIDING IMAGES AND VIDEO HAVING HIGH DYNAMIC RANGE

(71) Applicant: Polycom, Inc., San Jose, CA (US)

(72) Inventor: Stephen Schaefer, Cedar Park, TX (US)

(73) Assignee: Polycom, Inc., San Jose, CA (US)

( * ) Notice: Subject to any disclaimer, the term of this patent is extended or adjusted under 35 U.S.C. 154(b) by 11 days.

(21) Appl. No.: 15/371,031

(22) Filed: Dec. 6, 2016

(65) Prior Publication Data

US 2018/0160051 A1   Jun. 7, 2018

(51) Int. Cl.
| | |
|---|---|
| *H04N 5/265* | (2006.01) |
| *H04N 7/14* | (2006.01) |
| *H04N 7/15* | (2006.01) |
| *H04N 5/235* | (2006.01) |
| *G06T 5/00* | (2006.01) |
| *G06T 5/50* | (2006.01) |

(52) U.S. Cl.
CPC ............ *H04N 5/265* (2013.01); *G06T 5/008* (2013.01); *G06T 5/50* (2013.01); *H04N 5/2355* (2013.01); *H04N 7/147* (2013.01); *H04N 7/152* (2013.01); *G06T 2207/10016* (2013.01); *G06T 2207/10144* (2013.01); *G06T 2207/20208* (2013.01)

(58) Field of Classification Search
USPC ...................................... 348/14.07
See application file for complete search history.

(56) References Cited

U.S. PATENT DOCUMENTS

| | | | | |
|---|---|---|---|---|
| 2013/0163868 | A1* | 6/2013 | Wang | ............ G06T 5/009 382/170 |
| 2014/0132789 | A1* | 5/2014 | Koyama | ............ G06T 13/80 348/218.1 |
| 2015/0130967 | A1* | 5/2015 | Pieper | ............ H04N 5/2355 348/239 |
| 2016/0234455 | A1 | 8/2016 | Thompson et al. | |

* cited by examiner

*Primary Examiner* — Amal S Zenati
(74) *Attorney, Agent, or Firm* — Blank Rome, LLP

(57) ABSTRACT

Apparatuses, computer readable media, and methods are disclosed for providing composite images and/or videos having a high dynamic range. The apparatus includes a video capture module for capturing video images of a scene at a differing exposure levels. The apparatus further includes a region identification module for identifying regions in the captured video images of the scene that may benefit from being individually optimally-exposed. The apparatus further includes a region adjustment module for updating the positions of the various identified regions within the scene and a region exposure adjustment module for determining optimal exposure settings for the various identified regions of the scene. A video subsystem composites and encodes the various optimally-exposed regions of the scene onto a video image of a static portion of the scene having a high dynamic range that was, e.g., captured at a different moment in time than the various optimally-exposed regions of the scene.

24 Claims, 14 Drawing Sheets

SYSTEM AND METHOD FOR PROVIDING IMAGES AND VIDEO HAVING HIGH DYNAMIC RANGE

TECHNICAL FIELD

The present disclosure relates generally to image capture and video capture, e.g., in the context of videoconferencing systems and, more particularly, to intelligently segmenting captured image data of a scene into one or more optimally-exposed regions, e.g., "dynamic" regions of the scene, and compositing the one or more optimally-exposed regions onto a high dynamic range (HDR) representation of another one or more regions, e.g., "static" regions of the scene, in order to produce improved composited HDR images and/or video.

BACKGROUND

Videoconferencing involves communication between two or more videoconferencing terminals. Each videoconferencing terminal is typically placed within a conference room or in an office. One or more conference participants may then gather in one or more conference rooms or offices, each of which may have a videoconferencing terminal. Subsequently, one of the conference participants at a so-called 'near end' conference room or office may initiate a videoconference call by dialing a number, e.g., an IP address, telephone number, or other form of identification, associated with one or more videoconferencing terminals of the so-called 'far end' conference room(s) or office(s). Upon receiving the videoconferencing request, the far end participant(s) may answer the call, thereby approving the establishment of a videoconferencing session. Finally, the near end videoconferencing terminal and the far end videoconferencing terminal(s) may establish a videoconference call that allows conference participants to communicate with each other.

Each conference room or office where the participant(s) are located may have a unique illumination environment, e.g., different levels of illumination, different patterns of illumination, different types of illuminants, different placement of sources of illumination (lights, windows, etc.), etc. For example, one office or conference room may have a first set of ceiling lights that produce a first pattern of illumination, and another office or conference room may have a second set of ceiling lights that produce a second pattern of illumination. Furthermore, one office or conference room may have one or more windows, and another office or conference room may have no windows. It may also be the case that one office or conference room has one or more illuminated display screens (e.g., computer monitors, television screens, projection screens, etc.) that are displaying content that is relevant to the participants of the videoconference, and which exhibit a much different illumination level than the surrounding parts of the office or conference room.

The pattern of illumination in a conference room or office may also be non-uniform. For example, an office or conference room may have walls illuminated by overhead lighting and a non-shaded window that passes light from outside. An office or conference room may have its lights dimmed so that a projection screen is more easily seen. In other words, there may be distinct illumination regions (e.g., having a wide dynamic range among them) within the scene that is being captured. Within this scene, there may also be objects of interest, e.g., a speaker or other video conference participant, which are moving around in front of (or within) the distinct illumination regions. These objects of interest may have respective brightness levels that are different from one or more of the other illumination regions in the scene (including the static and/or background regions of the scene), and which may benefit from being properly exposed.

Thus, there is need for improved high dynamic range image and video creation for scenes with widely-varying illumination environments and, in particular, scenes with one or more objects of interest for which a respective optimized exposure may be desired. For example, there is a need for apparatuses, methods, and computer readable media that can composite one or more properly-exposed objects of interest from a scene onto an HDR version of the rest of the scene—without experiencing significant latency or delay in the creation or transmission of the improved image and/or video stream.

SUMMARY

In accordance with some embodiments disclosed herein, there is provided a method for providing an improved high dynamic range image or video stream. The method comprises segmenting the scene into one or more regions, wherein one or more of the regions may comprise "static" regions and one or more of the regions may comprise "dynamic" regions. The method may then proceed by capturing a first video image of the static regions of the scene at a first exposure level, capturing a second video image of the static regions of the scene at a second exposure level, and creating a combined video image of the static regions of the scene having a high dynamic range by using at least a portion of the first captured video image and at least a portion of the second captured video image. The method may then proceed by capturing images for each of the one or more dynamic regions of the scene with exposure settings optimized for the respective dynamic region and then compositing the exposure-optimized dynamic regions of the scene onto the high dynamic range image created over the static regions of the scene. The method may then display, store, and/or transmit the improved composited HDR image of the scene. Over time, the method may also periodically check to determine whether the static regions of the scene have changed beyond a threshold amount and, if so, create a new HDR image representation of the updated static regions of the scene for the exposure-optimized dynamic regions of the scene to be composited onto going forward.

In accordance with other embodiments disclosed herein, there is provided an apparatus for providing improved high dynamic range images or video streams in accordance with the methods summarized above. The apparatus may comprise one or more video sensors for capturing various video images of a scene at various exposure levels. The apparatus may further comprise a processing unit programmed with software instructions that when executed by the processing unit cause the processing unit to: segment the scene into one or more regions; and create a composited video image of the scene having a high dynamic range image for static regions and exposure-optimized image(s) for its dynamic regions.

In accordance with still other embodiments disclosed herein, there is provided a non-transitory program storage device, readable by a programmable control device, comprising instructions stored thereon that, when executed, cause the programmable control device to provide an improved composited high dynamic range image or video stream, in accordance with the methods summarized above.

BRIEF DESCRIPTION OF THE DRAWINGS

For the purpose of illustration, there are shown in the drawings certain embodiments described in the present disclosure. In the drawings, like numerals indicate like elements throughout. It should be understood that the full scope of the inventions disclosed herein are not limited to the precise arrangements, dimensions, and instruments shown. In the drawings.

DETAILED DESCRIPTION

Figure 1A:
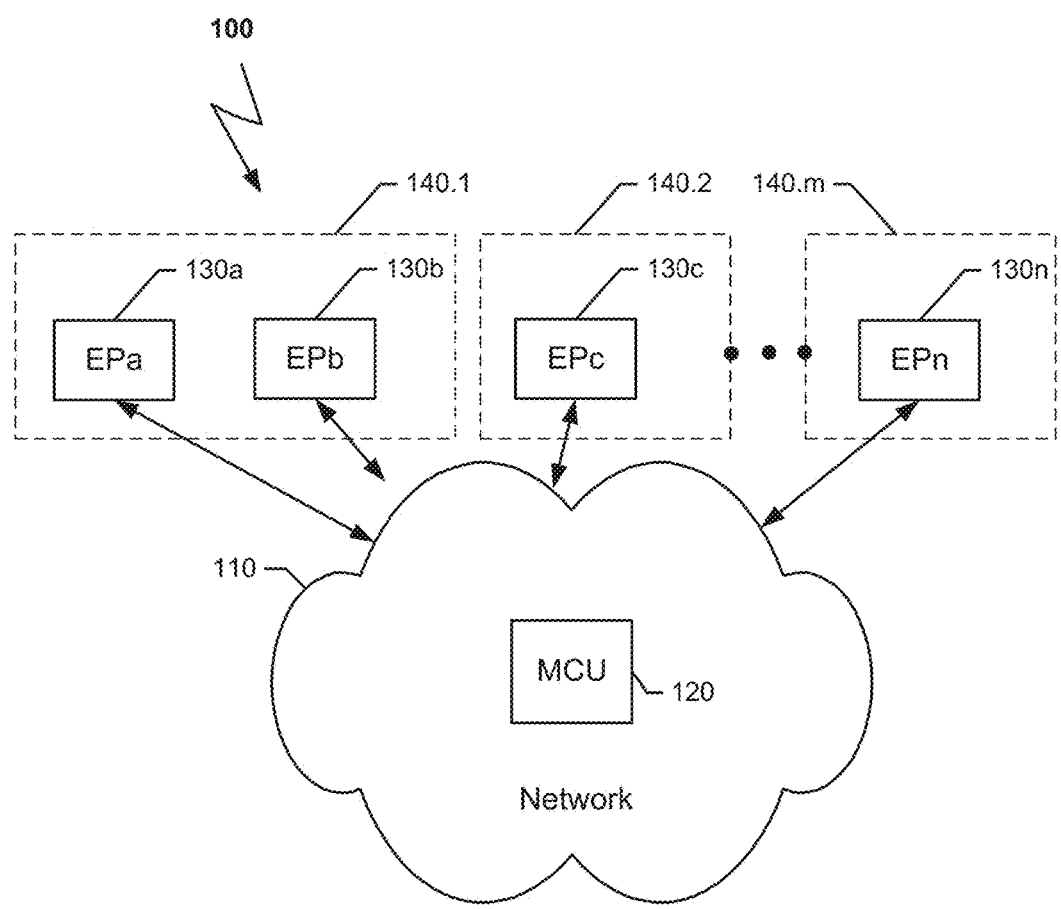
FIG. 1A illustrates a block diagram of an exemplary embodiment of a multimedia multipoint conferencing system comprising a plurality of endpoints and at least one multipoint control unit, in accordance with an exemplary embodiment disclosed herein.

Reference to the drawings illustrating various views of exemplary embodiments is now made. In the drawings and the description of the drawings herein, certain terminology is used for convenience only and is not to be taken as limiting the embodiments of the present disclosure. Furthermore, in the drawings and the description below, like numerals indicate like elements throughout.

Non-uniform lighting in an office, conference room, or other environment where video images are being captured may be disadvantageous for the viewer or recipient of the captured video images, e.g., participants who receive one or more such captured video images during a video conference. For example, because various areas in an office or conference room (or other video image capture environment) may be illuminated by various amounts light, captured video images of the scene may include "static" regions (e.g., backgrounds) that are underexposed and/or regions that are overexposed, depending on which area(s) of the scene the video camera adjusts its exposure settings based upon. Compensating for underexposure after the video images of the scene have been captured may result in brighter areas becoming overexposed. Likewise, compensating for overexposure after the video images of the scene have been captured may result in darker areas becoming underexposed. The scene may also possess "dynamic" portions, such as a speaker or video conference participant, that may enter into the bright areas of the scene or the darker areas of the scene over time—or straddle between the bright and dark areas of the scene at a given moment in time. It would thus be desirable for a video image capture system to be able to provide video images of a scene in which all or most portions of the captured video—including both the "static" regions of the scene and the "dynamic" regions of the scene—are optimally exposed, i.e., to account for potential large variations in brightness across the various regions of the scene.

FIG. 1A illustrates a block diagram of an exemplary multimedia multipoint conferencing system 100. The system 100 comprises one or more networks 110, one or more multipoint control units (MCU) 120, and one or more endpoints 130*a*, 130*b*, 130*c*, ... 130*n*, which communicate with one another over the one or more networks 110. The endpoints 130*a-n* may be situated at various geographical locations. For example, the endpoints 130*a-n* may be situated in conference rooms, offices, desktops of users and/or employees, etc. (hereinafter "locations") of a company or organization. The locations may be spread out over various geographical locations, e.g., in one or more cities, states, or countries. Any of the endpoints 130*a-n* may be fixed within their locations or mobile, e.g., as in the case of mobile phones, tablets, and/or laptop computers.

The one or more networks 110 may be a packet switched network, a circuit switched network, or a combination of the two. The one or more networks 110 may have a physical layer that is wired, wireless, or a combination of the two. Examples of the one or more networks 110 are (1) a public switched telephone network (PSTN) in which communications follow a standard, such as Synchronous Optical Networking (SONET), Synchronous Digital Hierarchy (SDH), Asynchronous Transfer Mode (ATM), integrated services digital network (ISDN), etc. (2) an Ethernet network in which the Internet protocol (IP) is used, (3) a wireless network, such as 802.11, also using IP; and (4) any combination of the foregoing.

Figure 1B:
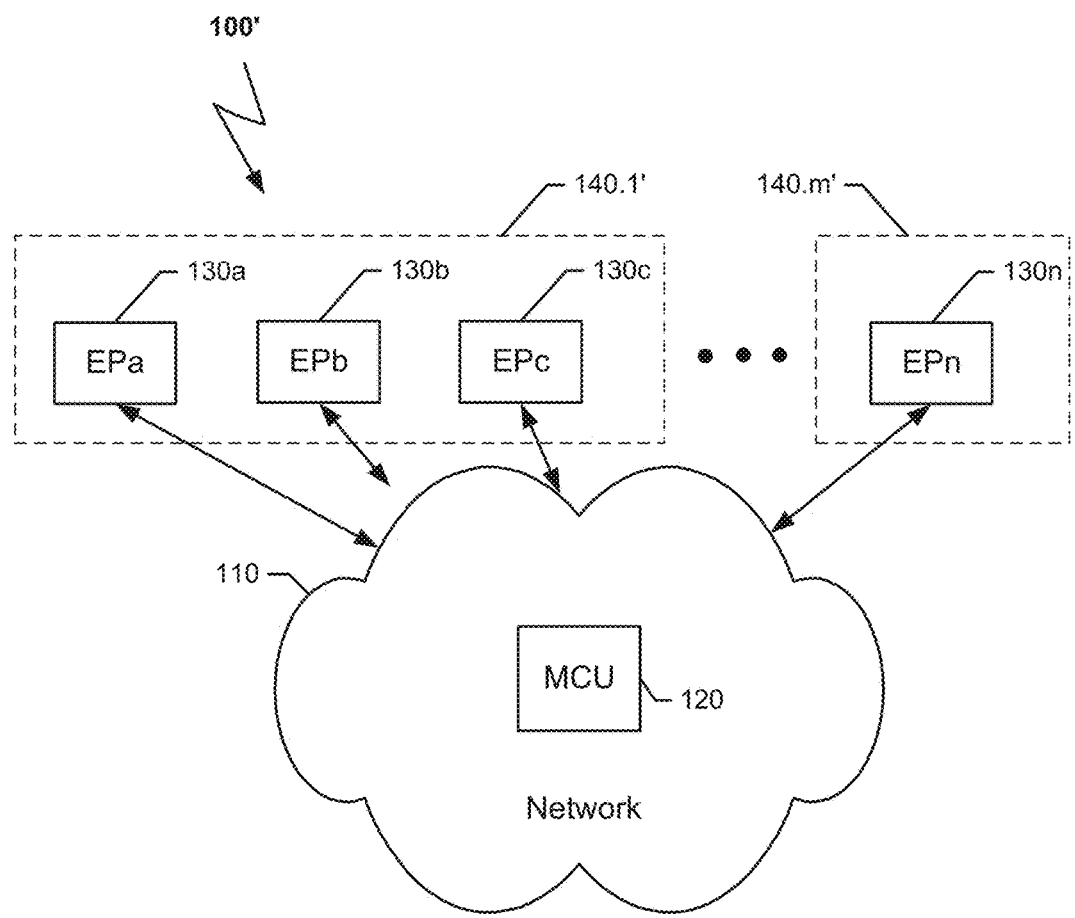
FIG. 1B illustrates a block diagram of another exemplary embodiment of a multimedia multipoint conferencing system comprising a plurality of endpoints and at least one multipoint control unit, in accordance with an exemplary embodiment disclosed herein.

The plurality of endpoints 130a-n may be distributed among a plurality of locations. In the exemplary embodiment illustrated in FIG. 1A, the endpoints 130a and 130b are located in a first location 140.1; the endpoint 130c is located in a second location 140.2; and the endpoint 130n is located in an $m^{th}$ location 140.m. It is to be understood that the distribution of the endpoints 130a-n is not limited to what is illustrated in FIG. 1A. Other distributions are contemplated. FIG. 1B, for example, illustrates another exemplary embodiment of the system 100, which exemplary embodiment is generally designated as 100', in which the endpoints 130a-c are located in a first location 140.1' and the endpoint 130n is located in an $m^{th}$ location 140.m'.

Figure 2:
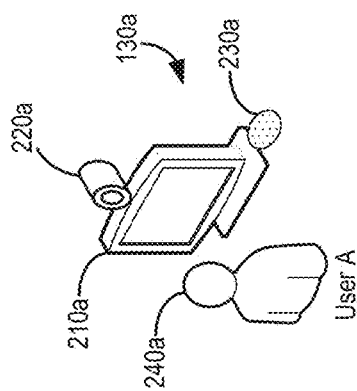
FIG. 2 illustrates an exemplary embodiment of one of the plurality of endpoints of FIGS. 1A and 1B, in accordance with an exemplary embodiment disclosed herein.

FIG. 2 shows an exemplary endpoint 130a comprising a display 210a, a camera 220a, and a speaker assembly 230a. A user, labeled "User A," 240a can use the endpoint 130a to establish and carry out videoconferencing with one or more far end participants, such as with the endpoint 130n. The endpoint 130a can be a personal desktop videoconferencing system (e.g., POLYCOM® HDX® 4000 Series), a conference room videoconferencing system (e.g., POLYCOM® HDX® 9000 Series), an immersive telepresence videoconferencing system (e.g., POLYCOM® RealPresence™ Experience (RPX) Series), a personal digital assistant or mobile-phone (e.g., APPLE® IPHONE®, IPAD®, SAMSUNG® GALAXY®), a desktop, laptop, or handheld tablet computer running a videoconferencing application (e.g., POLYCOM® CMA™ Desktop), etc. It is to be understood that each of the endpoints 130b . . . 130n may be configured like the endpoint 130a, e.g., to include one (or more) respective display(s) 210b . . . 210n (not illustrated), one (or more) respective camera(s) 220b . . . 220n (not illustrated), and a respective speaker assembly 230b-n (not illustrated). Although FIG. 2 illustrates that the endpoint 130a comprises one display 210a, one camera 220a, and one speaker assembly 230a, it is to be understood that the endpoint 130a may comprise more than one display 210a, more than one camera 220a, such as a plurality of cameras providing wide angle coverage, e.g., 360° coverage, of a conference room or office (or a plurality of cameras pointing in the same direction but having different fields of view), and/or more than one speaker assembly 230a. One advantage of having multiple cameras at an endpoint 130 is that it allows two (or more) video images of a scene with different exposure settings to be captured simultaneously (as opposed to serially, as would be the case when the endpoint has only a single camera and has to take two differently-exposed video images back-to-back).

In some embodiments having multiple cameras at an endpoint, one or more of the cameras that are not capturing the portion of the field of view that is currently being transmitted to the other endpoints (i.e., "dormant" cameras) may instead be used to "learn" the background (or otherwise static) regions of the scene being captured, e.g., by determining if or when the background (or otherwise static) regions of the scene have changed beyond a threshold amount (e.g., either in terms of brightness or color composition) and/or by determining optimal high dynamic range exposure settings for capturing the background (or otherwise static) regions of the scene. By contrast, the one or more cameras that are capturing the portion of the field of view that is currently being transmitted to the other endpoints may determine optimum exposure settings for one or more foreground (or otherwise dynamic) regions of the scene at any given moment in time.

As is explained in greater detail below, the optimally-exposed foreground (or otherwise dynamic) regions of the scene may be composited onto a previously-exposed high dynamic range representation of the background (or otherwise static) regions of the scene. The previously-exposed high dynamic range representation of the background (or otherwise static) regions of the scene may then only be updated periodically, or once one or more of the "dormant" cameras (or other endpoint environmental sensors) has determined that the background (or otherwise static) regions of the scene have changed by more than a threshold amount. By allowing the "dormant" cameras at the endpoint to maintain an up-to-date knowledge and/or high dynamic range captures of the background (or otherwise static) regions of the scene, the endpoint may be able to reduce the latency experienced when the endpoint needs to update the HDR representation of the background (or otherwise static) regions of the scene that it is using in the composited HDR images it is sending to the other endpoints. In endpoint embodiments that do not possess one or more "dormant" cameras to learn the background (or otherwise static) regions of the scene while transmitting composited HDR images to other endpoints, there may be a slight delay when the endpoint's camera has to capture the updated image(s) necessary to create a new HDR representation of the background (or otherwise static) regions of the scene. Once the updated representation has been created, the endpoint's camera may return to capturing optimally-exposed image(s) of the foreground (or otherwise dynamic) regions of the scene and compositing them onto the updated HDR representation of the background (or otherwise static) regions of the scene.

Figure 3:
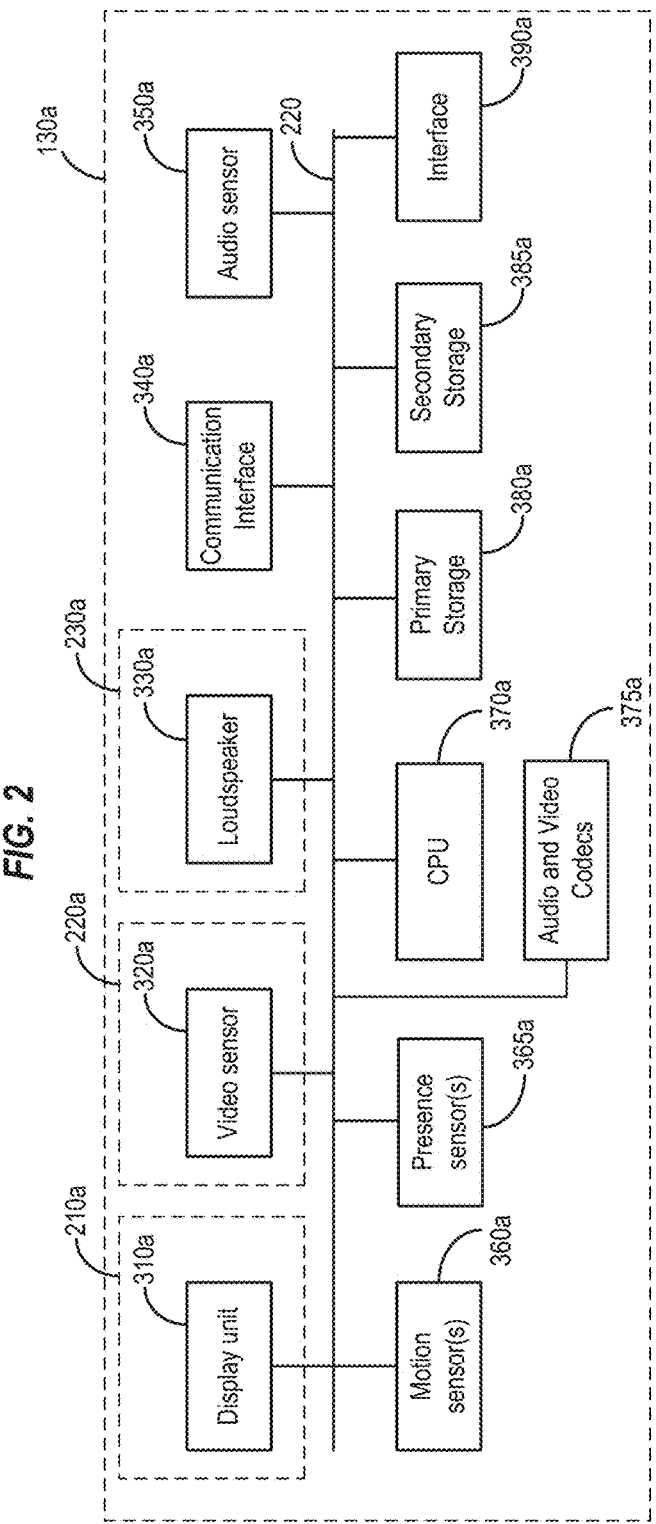
FIG. 3 illustrates a block diagram of the endpoint of FIG. 2, in accordance with an exemplary embodiment disclosed herein.

FIG. 3 shows an exemplary block diagram of the endpoint 130a. The endpoint 130a may comprise one or more display units 310a, one or more video sensors 320a, a loudspeaker 330a, a communication interface 340a, an audio sensor 350a, one or more motion sensor(s) 360a, one or more presence sensor(s) 365a, one or more CPUs 370a, audio and video codecs 375a, a primary storage 380a, a secondary storage 385a, and an interface 390a. The display unit 310a may be disposed with the display 210a and reproduce video signals, such as video images of one or more far end scenes. The display unit 310a may be an LED display panel, a plasma display panel, an OLED display panel, an LCD display panel, an LED-backlit LCD display panel, a cathode ray tube, etc. Although not illustrated, it is contemplated that in other exemplary embodiments of the endpoint 130a, the display 210a may be a projection device, such as a LCD projector, a DLP projector, an LCoS projector, an LED projector, a CRT projector, etc. for projecting video signals as video images of one or more far end scenes onto a projection surface. In each of these embodiments, the display unit 310a is a projection unit in an LCD, DLP, LCoS, LED, CRT, etc. projector 210a. Furthermore, although FIG. 3 illustrates that the endpoint 130a comprises one display unit 310a, one video sensor 320a, and one loudspeaker 330a, it is to be understood that the endpoint 130a may comprise more than one display unit 310a, more than one video sensor 320a, and/or more than one loudspeaker 330a.

The video sensor 320a may be disposed within the camera 220a. The video sensor 320a may capture video images in two-dimensions (2D) as well as three-dimensions (3D). As mentioned above, in endpoints with two or more cameras, the cameras may be arranged within the endpoint such that they provide wide angle coverage, e.g., 360° coverage, of the scene being captured. In other endpoint embodiments, two or more cameras may share partially (or fully) overlapping fields of view, such that two different cameras could simultaneously capture images of the same region(s) of the scene, but with different exposure settings. The loudspeaker 330a is disposed within the speaker assembly 230a. The loudspeaker 330a may reproduce audio signals representing voice of one or more far end participants. The communication interface 340a may include a network interface, such as a wireless interface, an Ethernet interface, a connection to a PSTN, etc. for sending and receiving communication signals over the network 110.

The audio sensor 350a may comprise one or more microphones for capturing the voice and sound of one or more users (e.g., the User A 240a). The one or more motion sensors 360a are one or more respective sensors for detecting objects in motion within the scene captured by the video sensor 320a as the captured video images. The one or more motion sensors 360a may be passive infrared sensors, microwave sensors, ultrasonic sensors, etc. The one or more presence sensors 365a are one or more respective sensors for detection the presence of objects near to the video sensor 320a. The one or more presence sensors 365a may be infrared sensors. The interface 390a provides the user 240a with an interface to functionality of the endpoint 130a.

The CPU 370a may comprise one or more microprocessors. The primary storage 380a may be any kind of computer memory, such as any kind of addressable semiconductor memory, such as volatile memory, nonvolatile (e.g., non-transitory) memory, or a combination of volatile and non-volatile memory. Nonvolatile memory may include any of ROM, PROM, EPROM, and EEPROM memory. Volatile memory may include any of RAM (e.g., SRAM, DRAM, etc.), and CPU cache memory, such as static RAM, SRAM, etc. The secondary storage 385a may be any kind of tangible computer-readable medium, such as a magnetic medium, e.g., a computer hard drive, an optical medium, e.g., an optical disc, a solid-state memory, e.g., a flash memory, and other storage media known in the art.

The audio and video codecs 375a can include audio and video compression hardware, software, or a combination of hardware and software. The software portion of the audio and video codecs 375a may be tangibly stored in the secondary storage 385a. Any of the functionality performed by the CPU 370a described herein may be implemented in software code or instructions that are tangibly stored on the secondary storage 385a. Upon loading the software instructions into the primary storage 380a from the secondary storage 385a and executing such software code or instructions by the CPU 370a, the CPU 370a may perform any of the functionality of the endpoint 130a or the CPU 370a described herein, including any steps of the method 500 described below. The method 500 may also include loading the audio and video codecs from the secondary storage 385a into the primary storage 380a and executing the audio and video codecs.

Audio codecs can include, but are not limited to, G.711, G.723, G.726, G.728, G.729, etc. of the International Telecommunication Union Telecommunication Standardization Sector (ITU-T). Video codecs can include, but are not limited to, H.263, H.264, H.265 etc. of the ITU-T.

Figure 4:
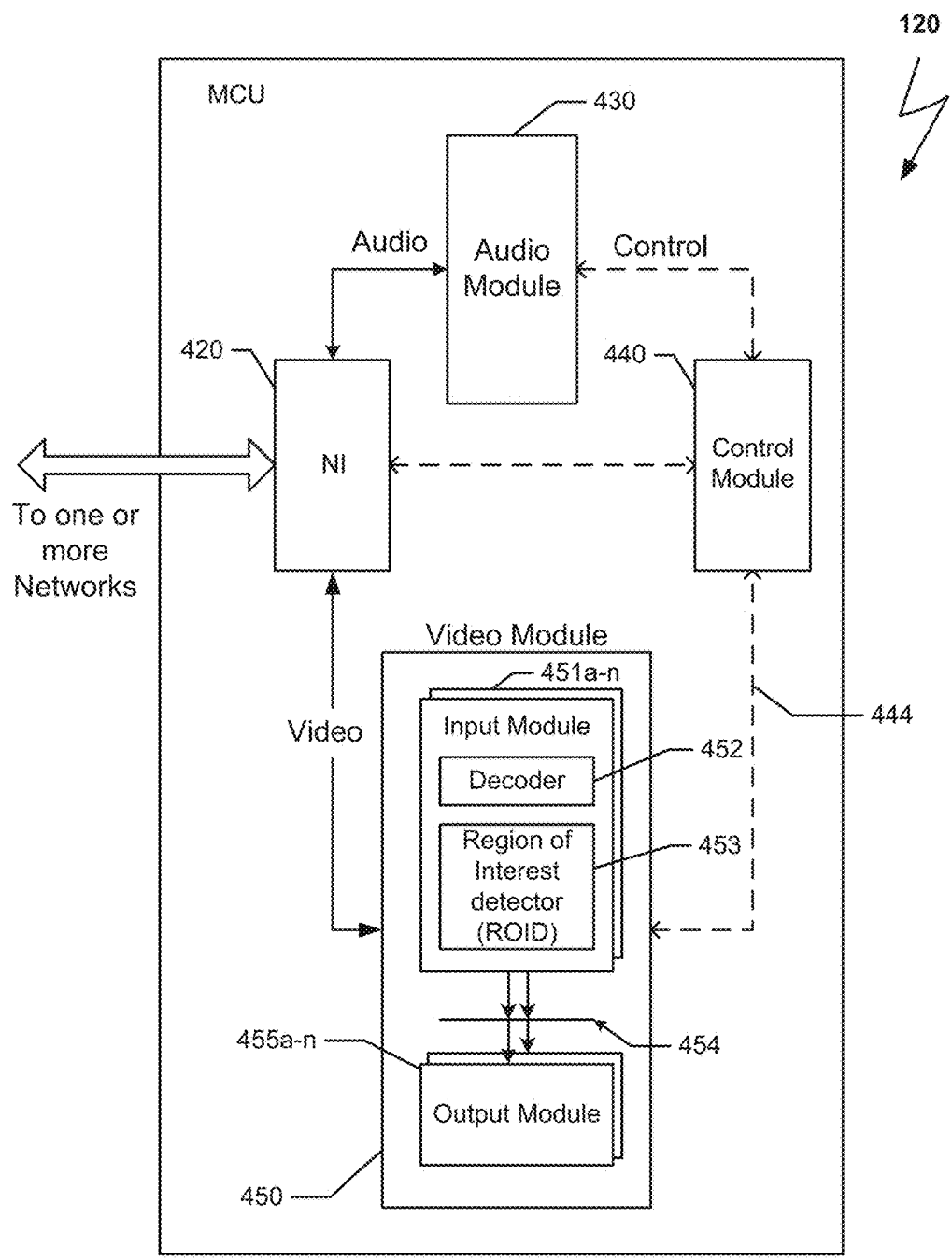
FIG. 4 illustrates a block diagram of the multipoint control unit of FIGS. 1A and 1B, in accordance with an exemplary embodiment disclosed herein.

FIG. 4 illustrates relevant elements of the MCU 120, in accordance with an exemplary embodiment described herein. The MCU 120 may include a network interface module (NI) 420, an audio module 430, a control module 440, and a video module 450. The network interface module 420 receives communications from the plurality of endpoints 130a-n via the one or more networks 110. The network interface 420 processes the communication according to one or more of a variety of communication standards such as but not limited to ITU-T H.320, ITU-T H.323, SIP, etc. The communications protocol may be ITU-T H.221, H.230, or H.242. More information concerning the communications between the endpoints 130a-n and the MCU 120 over the one or more networks 110 and information describing signaling, control, compression, and setting a video call can be found in the foregoing ITU-T standards.

The network interface 420 receives and transmits control and data information to and from other MCUs and the endpoints 130a-n. The network interface module 420 multiplexes and de-multiplexes the different signals, media and/or "signaling and control," that are communicated between the endpoints 130a-n and the MCU 120. Compressed audio signals are transferred to and from the audio module 430. Compressed video signals are transferred to and from the video module 450. Control and signaling are transferred to and from the control module 440.

If a distributed architecture is used, the network interface module 420 can be capable of handling various image information that is transferred between the control module 440 and the endpoints 130a-n. The audio module 430 may receive, via the network interface 420 and the audio line, compressed audio streams from the plurality of endpoints 130a-n. The audio module 430 decodes the compressed audio streams, analyzes the decoded streams, selects certain streams, and mixes the selected streams. Then the mixed stream is compressed, and the compressed audio stream is sent via the audio line back to the network interface 420 which sends the compressed audio streams to the different endpoints.

Audio streams that are sent to different endpoints 130a-n can be different. For example, the audio stream can be formatted according to the different communication standard and according to the needs of the individual endpoint 130a-n. The audio stream may omit the voice of the user associated with the endpoint to which the audio stream is sent. However, the voice of this user can be included in all other audio streams. The audio module 430 can be adapted to analyze the received audio signals from the endpoints and determine the energy of each audio signal. Information on the signal energy can be transferred to the control module 440. The energy level can be used as a selection parameter for selecting appropriate one or more endpoints as the source of the mixing of the audio and/or the video of the conference. The endpoints can be referred to as selected endpoints or presented endpoints.

The video module 450 receives compressed video streams from the plurality of endpoints 130a-n, which are sent toward the MCU 120 via the one or more networks 110 and processed by the network interface 420. The video module 450 can create one or more compressed video images according to one or more layouts that are associated with one or more conferences currently being conducted by the MCU 120. An exemplary video module 450 can have a plurality of input modules 451a-n, a plurality of output modules 455a-n, and a video common interface 454. Each input module 451a-n can be associated with a respective endpoint 130a-n. Each output module 455a-n can be associated with one or more endpoints 130a-n. The control module 240 can be a logical unit that controls the operation of the MCU 120.

The exemplary input module 451a-c can include among other elements a decoder 452 and a region of interest detector (ROID) 453. The decoder 452 receives compressed video from an associated endpoint. An associated endpoint is an endpoint that is associated with the relevant input module 451. The decoder 452 decodes the compressed video into decoded video data. Usually the decoded video data is constructed from three components, Y, U, and V. One component reflects the brightness, the Y component, and the other two components, U and V, reflect the chrominance of the pixel, for example. The decoded information is stored in a decoder frame memory from which it is transferred toward the one or more output modules 455a-c via the common interface 454. The ROID 453 may be used to detect any one or more regions within the output video stream that are of interest to a particular implementation. For example, in one implementation, the regions of interest may comprise the foreground (or otherwise dynamic) regions within the scene. In another implementation, the regions of interest may comprise solely the faces and/or bodies of the video conference participants.

Common functionality of the video module 450 and the various elements of video module 450 are known in the art and are not described in detail herein. Video modules are described, e.g., in U.S. Pat. Nos. 6,300,973; 7,535,485; 8,289,371; and 8,805,928, the contents or which patents are incorporated herein by reference.

Figure 5:
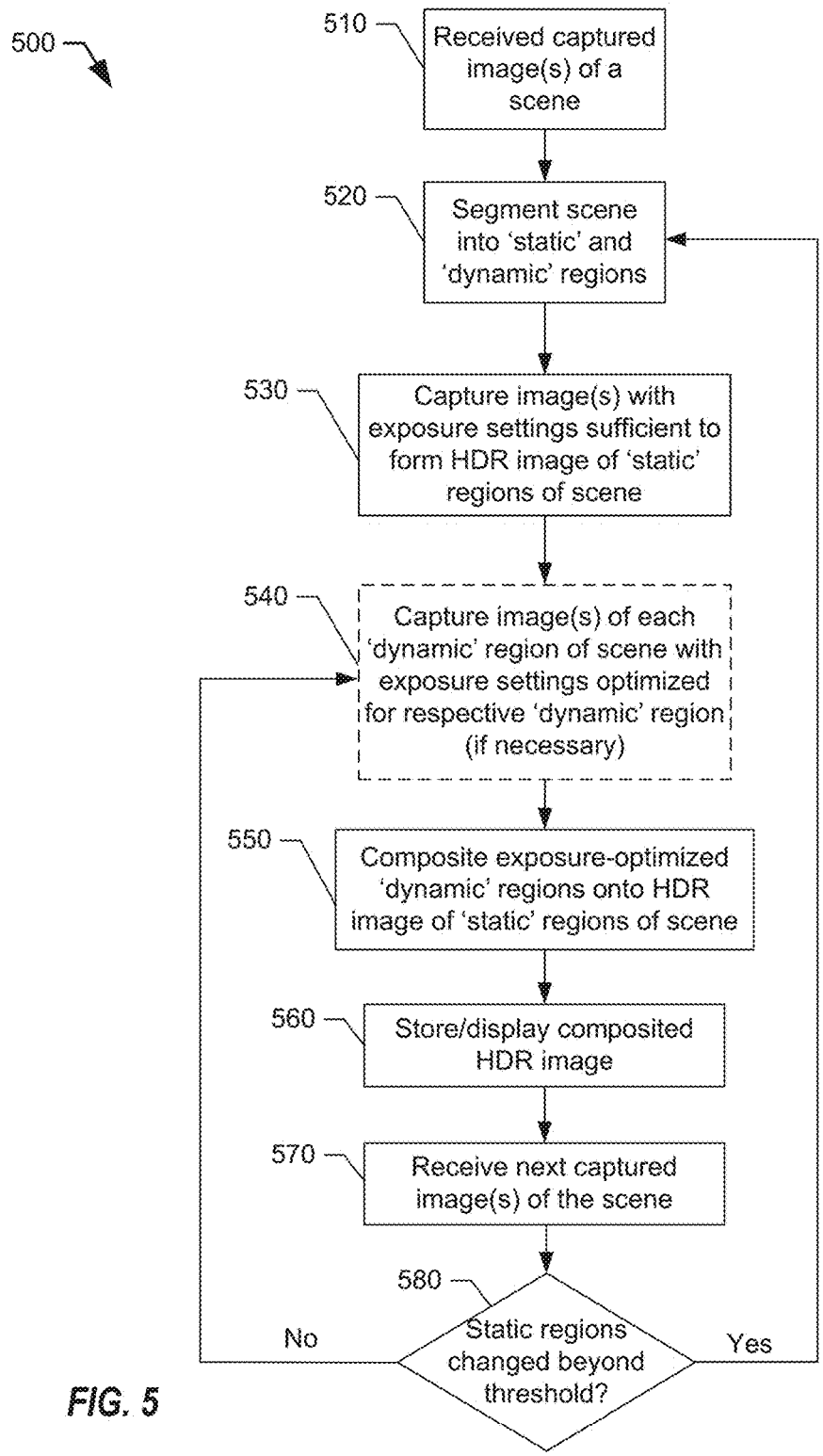
FIG. 5 illustrates an exemplary embodiment of a method for creating improved high dynamic range video images in the endpoint of FIG. 2, in accordance with an exemplary embodiment disclosed herein.

Illustrated in FIG. 5 is an exemplary embodiment of a method 500 for creating improved high dynamic range video images in the endpoint of FIG. 2, in accordance with an exemplary embodiment disclosed herein. First, at Step 510, a captured video image of the scene is received, e.g., at an endpoint being used by a videoconferencing participant. Next, at Step 520, the captured image may be segmented into different regions. In some embodiments, the regions may be segmented based upon a determination of whether the pixels in such regions are characterized as "static" or "dynamic." In such embodiments, the "static" regions of the scene may comprise what is typically referred to as the background of the scene, assuming no elements in the background of these scene are exhibiting a threshold amount of motion (e.g., a TV monitor at the back of a room with moving images displaying on it may be in the background of the scene, but may not be "static," due to moving images it is displaying). Further, in such embodiments, the "dynamic" regions of the scene may comprise what is typically referred to as the foreground of the scene, assuming no elements in the foreground of these scene are exhibiting less than a threshold amount of motion (e.g., a table that is close to the camera capturing the scene may be in the foreground of the scene, but may not be "dynamic" since it is a stationary, inanimate object).

In some such embodiments, the determination of whether a particular region is characterized as being "static" or "dynamic" may be based on whether the region has greater than a threshold amount of motion or less than the threshold motion amount. In other embodiments, a more sophisticated segmentation scheme may be employed, e.g., possessing two or more static regions and two or (many) more dynamic regions. As is explained below, in such embodiments, different images may be captured for each dynamic region (e.g., with optimal exposure settings for each of the respective dynamic regions), followed by a combination of the optimally-exposed dynamic regions with a previously-created high dynamic range exposure of the static region(s) of the scene to form a resultant composite high dynamic range image. The composite HDR image is thus able to maintain a properly-exposed dynamic region of the scene layered over a high dynamic range static region of the scene that was captured at a previous point in time—without the need to capture multiple exposures of the scene at every point in time to maintain the high dynamic range of the resultant video stream of images, as would be necessary with traditional HDR video capture.

At Step 530, once the static regions have been identified and segmented from the originally-captured video image of the scene, an additional image(s) of the scene may be captured for each of the static regions (if necessary) sufficient to be able to form HDR representations of the static portions of the scene. In some cases, the static regions of the scene may be properly exposed in the original captured video image, thus eliminating the need to take additional low-exposure and/or high-exposure images of the scene for such regions. As may be understood, in some embodiments, the end point may comprise multiple video sensors capable of simultaneously capturing multiple overlapping images of the scene with different exposure settings. In other embodiments, e.g., embodiments with endpoints comprising only a single video sensor, the images of the scene necessary for forming the HDR representation of the static regions of the scene may be captured serially, i.e., one after the other, with differently exposure settings, e.g., low-exposure settings, followed by high-exposure settings. In some embodiments, it will be desirable that the additional images are captured as closely in time to each other as is possible, so as to minimize differences in scene composition, movement, and/or lighting between the capture of the various additional images.

At Step 540, additional images may be captured (if necessary) for each of the dynamic regions of the scene with the camera's exposure settings optimized for the respective dynamic region of the captured scene. In some embodiments, the respective portions may be non-overlapping portions of the captured scene. In other embodiments, the respective image for each dynamic region of the scene may comprise an image captured with an automatically-determined exposure setting (e.g., an EV0 image that has not been biased positively or negatively from the exposure settings for the respective region, as determined by the video module's auto exposure system). Step 540 is indicated as optional (and shown in a dashed line box in FIG. 5) because the captured image of scene may already be optimally exposed for the dynamic region(s) of the scene, and thus a further capture would not be necessary. Further, in scenes with two or more dynamic regions, a single optimized-exposure may have adequately captured each of the dynamic regions of the scene, meaning a separate individual exposure-optimized capture for each dynamic region of the scene would not be necessary.

In some embodiments, the dynamic regions of the scene may also require a high dynamic range capture (e.g., comprising the combination of two or more images taken at different exposure levels) in order to be captured with optimal exposure. In such embodiments, the end point may capture alternating low and high exposure versions of the dynamic regions and combine them to create an HDR representation of the dynamic regions before compositing them onto the static regions of the scene. For example, if the endpoint is capturing the scene at a rate of 60 frames per second, then it could alternate between low exposure captures and high exposure captures between each captured frame and compose an output stream of HDR images at half of the capture frame rate, e.g., 30 frames per second. In embodiments where such latency is not desired, the endpoint may simply capture a single image of the dynamic region, e.g., with exposure settings designed to capture as much of the dynamic region in an optimally-exposed manner as is possible. In still other embodiments, e.g., embodiments wherein the endpoint comprises two or more cameras with overlapping fields of view, two or more of the cameras may be used to capture simultaneous images of the dynamic region of the scene with different exposure settings, which images may then be combined and serve as the optimally-exposed capture of the dynamic region of the scene for that frame.

As Step 550, the exposure-optimized captures of the dynamic portions of the scene from Step 540 may be composited on top of the HDR capture of the static portion of the scene from Step 530 to create a "composited HDR image." Various blending techniques, e.g., Poisson blending, may be employed to soften the transition between the dynamic regions and the static regions in the composited HDR image.

Finally, once a composite high dynamic range image has been constructed with the optimally exposed dynamic regions of the scene and the high dynamic range representation of the static regions of the scene, at Step 560, the composite high dynamic range image may be stored in a memory, e.g., primary storage 380 or secondary storage 385, displayed, and/or transmitted to one or more other endpoints.

At Step 570, the next captured image (or images, in the case of an endpoint with multiple cameras) may then be received. As described above, one or more of the cameras at an endpoint may provide a continuous stream of images captured at a desired frame rate, e.g., 60 frames per second or 30 frames per second. An HDR logic module in the endpoint may analyze the next captured image, e.g., to determine if the scene composition has changed by more than a threshold amount. For example, Step 570 may detect, identify, and/or determine the updated sizes and locations of the various static and dynamic regions of the scene, make any region adjustments (as necessary) for the updated composition of the captured scene, and determine exposure adjustments (as necessary) for the updated static and dynamic regions of the scene.

At Step 580, if it has been determined that the static regions of the scene have changed beyond a threshold amount (i.e., the "YES" prong of Step 580), the method may return to Step 520 to segment the scene into the newly-determined static and dynamic regions, and then capture images sufficient to form an updated HDR image of the static regions of the scene, as well as updated optimally-exposed representations of the dynamic regions of the image (if necessary), as detailed in Steps 530 et seq. If, instead, at Step 580, it has been determined that the static regions of the scene have not changed beyond a threshold amount (i.e., the "NO" prong of Step 580), the method may return to Step 540 (thus bypassing Step 530) to capture updated exposure-optimized images of each dynamic region of the scene, while reusing the previously-constructed HDR representation of the static regions of the scene. As may now be more fully appreciated, in endpoints having only a single camera, method 500 allows for the creation of an improved composite HDR image that may be predominantly high-dynamic range in makeup (i.e., within the static regions of the scene), while also having an optimally-exposed dynamic region—all while taking only a single image capture for any given composited image created at a particular moment in time by the endpoint. (Of course, additional image frames, e.g., a low-exposure capture and a high-exposure capture, of the scene at a given point in time may also be captured when it has been determined that the HDR representation of the static regions of the image is to be updated, e.g., the "YES" prong of Step 580.)

The method 500 of FIG. 5 may continue for as long as the endpoint continues to capture new images of the scene and it is desired that an improved composited HDR image be constructed and transmitted from the endpoint.

Figure 6:
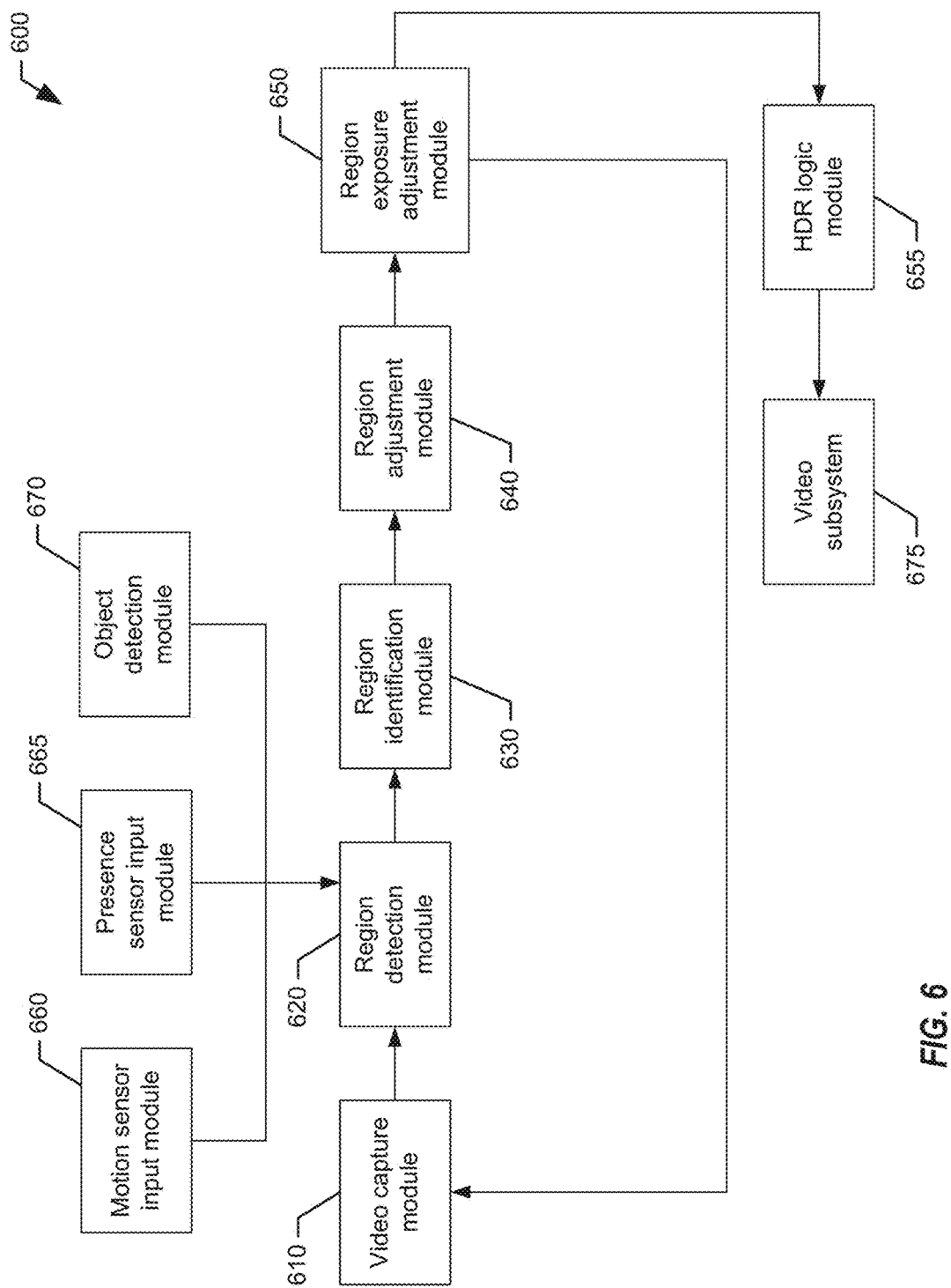
FIG. 6 illustrates an exemplary embodiment of a software framework implemented by a CPU of the endpoint of FIG. 2, in accordance with an exemplary embodiment disclosed herein.

Illustrated in FIG. 6 is an exemplary embodiment of a software framework 600 that may be implemented by a CPU 370a of the endpoint 130a. With reference to FIG. 6, the software framework 600 may comprise a video capture module 610, a region detection module 620, a region identification module 630, a region adjustment module 640, a region exposure adjustment module 650, a motion sensor input module 660, a presence sensor input module 665, an object detection module 670, an HDR logic module 655, and a video subsystem 675 encoded in the software instructions, which may be tangibly stored in the secondary storage 385a. The CPU 370a may load such software instructions into the primary storage 380a and execute them to implement the software framework 600 and to perform, e.g., the method 500. For example, video capture module 610 may initiate and/or receive the capture of video images of the scene by the one or more video sensors of the end point device. Region detection module 620 may process information from any number of sources, e.g., motion sensor input module 660, presence sensor input module 665, and/or object detection module 670, to determine that there are one or more regions in the scene that may lend themselves to being optimally exposed and/or one or more regions in the scene that may lend themselves to being represented by a single high dynamic range exposure image over the duration of two or more captured frames. E.g., the detection of motion in certain regions may allow the region detection module to delimit between "dynamic" or, motion, regions and "static" or, non-motion, regions. Such regions may lend themselves better to different exposure settings, e.g., because using longer exposure times with regions of the image exhibiting high degrees of motion may lead to unwanted motion blurring. Likewise, if the presence of particular persons and/or objects are detected in different regions of the scene, they may also lend themselves better to differing, optimal exposure settings, e.g., because using longer exposure times with a region of the scene corresponding to a participants face may lead to a better exposure of the participants face, whereas using longer exposure times with regions of the scene where a display screen with moving images has been detected may be likely to lead to an overexposure of that portion of the image.

Region identification module 630 may, e.g., be used to identify, match, and/or track the movement of particular regions from a first captured video image to a subsequently captured video image. For example, if the captured scene is one of a conference room, one of the detected regions may correspond to the "Ceiling and Walls" in the room, and another of the detected regions may correspond to the "Speaker" in the room. If these regions may be identified and tracked from captured image to captured image, certain processing time may be saved, e.g., by utilizing a previously-captured HDR exposure of one or more of the regions that has not changed beyond a threshold amount with respect to a previously captured image frame (e.g, the "Ceiling and Walls" region) and/or optimally adjusting the camera's exposure settings for a changing region of the image (e.g., the "Speaker" region).

Region adjustment module 640 and region exposure adjustment module 650 may be applied at each frame (or at predetermined or varying time intervals) to determine whether any previously detection regions need to be adjusted, e.g., adjusted in size or shape (such as a speaker moving his or her face closer to the capturing camera) or if the exposure settings for a detected region should be adjusted or updated (e.g., if the ceiling lights are switched off, that region of the scene may suddenly need different exposure settings, or it may cease to be a distinct region in the scene any longer). Once any necessary adjustments to the exposure settings for the various regions have been made by region exposure adjustment module 650, the information may be communicated back to video capture module 610 so that subsequent images of each of the regions may be captured with their updated exposure settings. Concurrently, each of the exposed regions that will be used to reconstitute a single image of the captured scene may be sent to HDR logic module 655. HDR logic module 655 may execute software instructions to reconstruct a single composited HDR image of the captured scene using the respective portions of the optimally-exposed captured video images in the respective regions of the scene and the HDR representation of the static portions of the scene. HDR logic module 655 may also be responsible for blending or blurring between the borders of the respective portions (e.g., so as to soften the transitions between the various composited regions) and performing any other image processing desired on the composited high dynamic range image (e.g., tone mapping, cropping, exposure/focus/color adjustment, etc.). Finally, the composited high dynamic range image may be sent to video subsystem 675 for display, storage, and/or transmission to a far end conference participant.

Figure 7A:
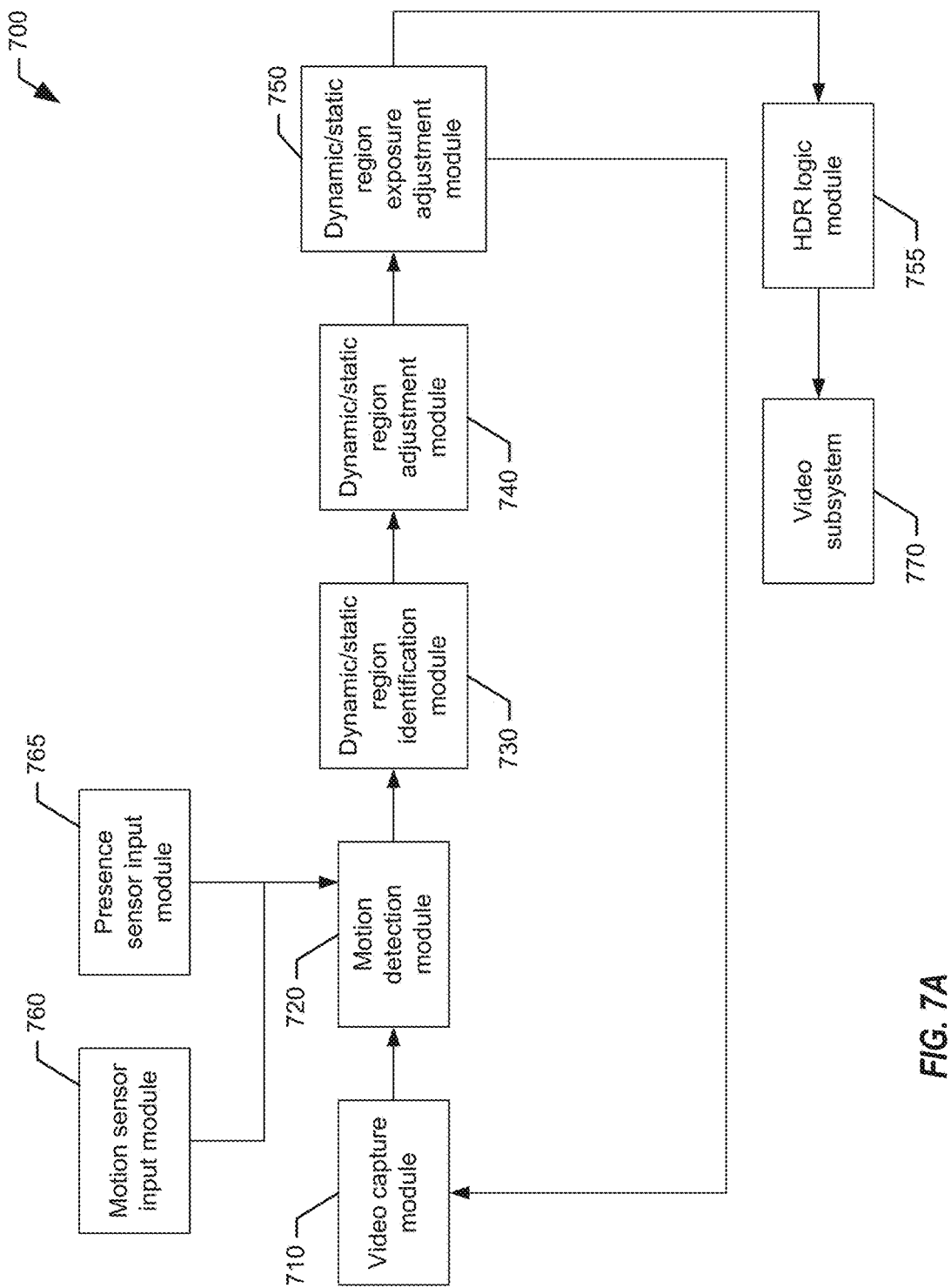
FIG. 7A illustrates another exemplary embodiment of a software framework implemented by a CPU of the endpoint of FIG. 2, in accordance with an exemplary embodiment disclosed herein.

Illustrated in FIG. 7A is another exemplary embodiment of a software framework 700 that may be implemented by a CPU 370a of the endpoint 130a. With reference to FIG. 7A, the software framework 700 may comprise a video capture module 710, a motion detection module 720, a dynamic/static region identification module 730, a dynamic/static region adjustment module 740, a dynamic/static region exposure adjustment module 750, a motion sensor input module 760, a presence sensor input module 765, an HDR logic module 755, and a video subsystem 770 encoded in the software instructions which may be tangibly stored in the secondary storage 385a. The CPU 370a may load such software instructions into the primary storage 380a and executes them to implement the software framework 700 and to perform, e.g., the method 500. The various elements of software framework 700 perform analogous roles to the correspondingly named (and numbered) elements of software framework 600 described above, with the exception that software framework 700 of FIG. 7A describes, in greater detail, an embodiment wherein the various regions of the captured scene are segmented based on an identification of whether the particular region is part of the "dynamic" region of the image (e.g., where there is greater than a threshold amount of motion) or the "static" region of the image (e.g., where there is less than a threshold amount of motion).

Turning now to FIG. 7A, upon execution of the software instructions by the CPU 370a, the video capture module 710 receives a video image of a scene, e.g., a scene of a conference room or office, which video image may be captured by the one or more video sensors 320a of the camera 220a of the endpoint 130a. The video capture module 710 may store the received captured video image(s) in the primary storage 380a. The video capture module 710 may then provide the captured video image to the motion detection module 720, which analyzes the captured video image to determine which portions of it are objects in motion and which portions of it are not. This determination may be made based on an analysis of information from motion sensor input module 760 and/or presence sensor input module 765. Next, the dynamic/static region identification module 730 may determine the areas of the captured video image that correspond to the static regions of the captured video image and the areas of the video image that correspond to the dynamic regions of the captured video image.

Areas of the video image that feature objects in motion may typically correspond to the foreground of the video image, and areas of the image which do not feature objects in motion may typically correspond to the background of the video image, though this is not always necessarily the case. The motion detection module 720 may use any of a number of methods known in the art for separating the video image into moving (e.g., foreground) and non-moving (e.g., background) components. In general, such methods may use an algorithm that compares the captured video image of the scene to one or more previously captured video images of the scene stored in the primary storage 380a to identify the portions of the captured video image that have changed relative to the one or more previously captured video images stored in the primary storage 380a. The portions of the scene that have changed may correspond to the moving (i.e., dynamic) portion, and the portions of the scene that have not changed may correspond to the non-moving (i.e., static) portion.

The motion sensor input module 760 mentioned above may receive input from the one or more motion sensors 360a and pass it to the motion detection module 720. The presence sensor input module 765 mentioned above may receive input from the one or more presence sensors 365a and pass it to the motion detection module 720.

The one or more motion sensors 360a may be configured to detect motion within a first predetermined threshold distance of the motion sensors 360a. The first predetermined threshold distance may specify the effective range of the one or more motion sensors 360a. Because the endpoint 130a may be intended for use within a room, e.g., an office or conference room, the one or more motion sensors 360a may be sensitive to motion within the room only and insensitive to motion beyond walls and windows. In an exemplary embodiment, the motion sensor(s) 360a may be infrared or microwave sensors that detect motion within a large distance, e.g., within 75 feet (the first predetermined threshold distance), and that do not detect motion beyond walls or windows. For example, the motion sensor(s) 360a may be configured to detect a moving person within the room in which the endpoint 130a is disposed and not detect a moving tree which is visible by the video sensor 320a through a window in the room and which is within the first predetermined threshold distance from the motion sensor(s) 360a. It is to be understood that first predetermined threshold distances of greater than 75 feet or less than 75 feet are contemplated.

The one or more presence sensors 365a may also detect the presence of objects or people within a second predetermined threshold distance of the one or more presence sensors 365a, i.e., within close proximity to the one or more presence sensors 365a. Because the endpoint 130a may be intended for use within a room, e.g., an office or conference room, the one or more presence sensors 365a may be sensitive to the presence of objects or people within the room only and insensitive to the presence of objects or people beyond walls and windows. In an exemplary embodiment, the presence sensor(s) 365a may be infrared or microwave sensors that detect the presence of objects or people within a short distance, e.g., within 10 feet (the second predetermined threshold distance), and that do not detect the presence of objects or people beyond walls or windows. For example, the one or more presence sensors 365a may be configured to detect a person within 10 feet of the endpoint 130a in the room but not a person beyond 10 feet of the endpoint 130a in the room. It is to be understood that second predetermined threshold distances of greater than 10 feet or less than 10 feet are contemplated. For example, in embodiments in which the endpoint 130a is located within a small conference room, e.g., one that is smaller than 20 by 20 feet, the second predetermined threshold distance may be five feet. Conversely, in embodiments in which the endpoint 130a is located within a large conference room, e.g., one that is 100 by 100 feet, the second predetermined threshold distance may be 30 feet.

The dynamic/static region adjustment module 740 may adjust the dynamic region identified by the dynamic/static region identification module 730 and/or the static region identified by the dynamic/static region identification module 730, if necessary. To effect such adjustment, the dynamic/static region adjustment module 740 may perform several exemplary sub-steps, which are illustrated in greater detail in FIG. 7B.

Figure 7B:
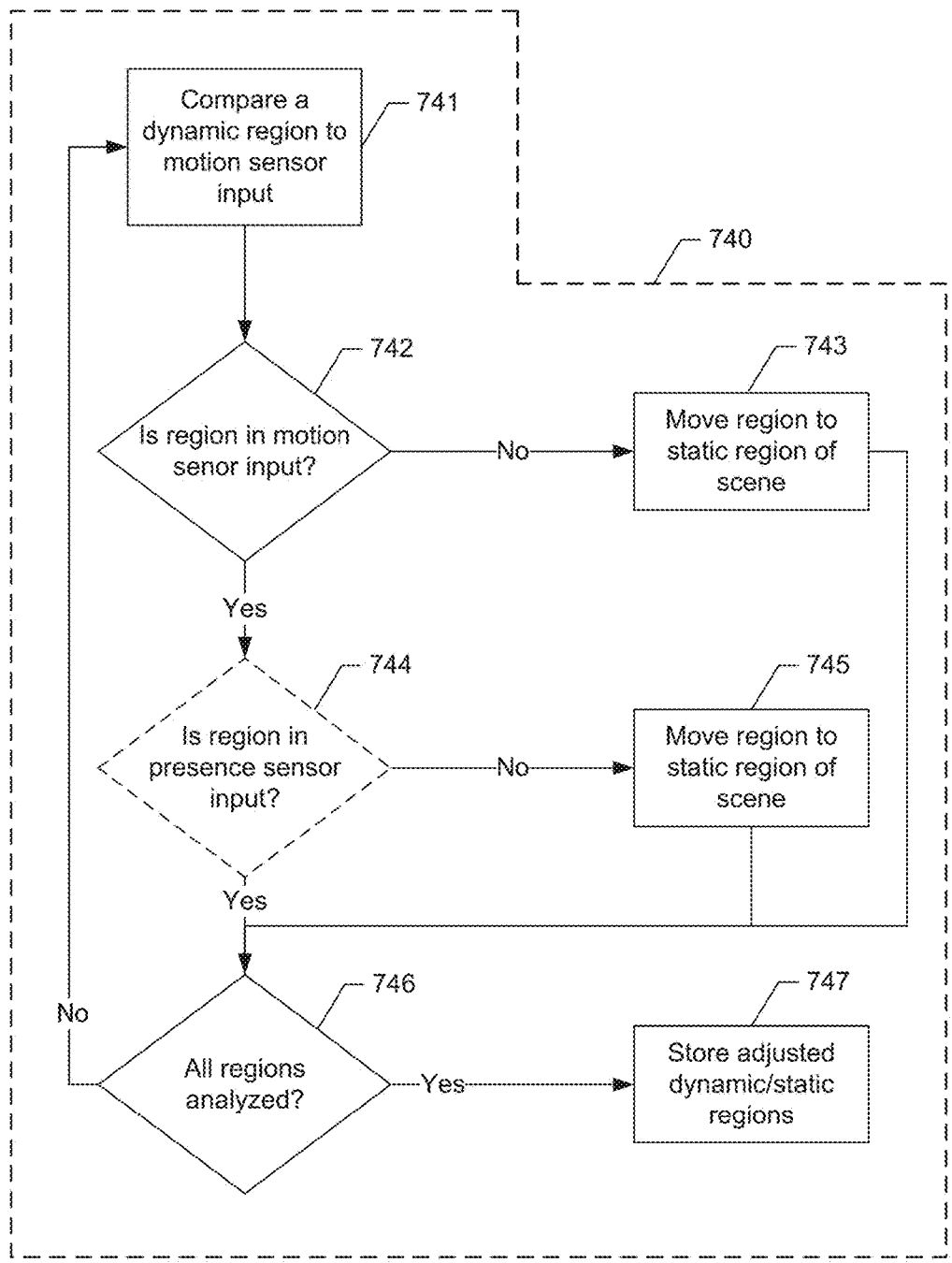
FIG. 7B illustrates a method for adjusting the foreground and background of a captured video image of a scene, in accordance with an exemplary embodiment disclosed herein.

With reference to FIG. 7B, in a Step 741, the dynamic/static region adjustment module 740 compares a region of the identified dynamic region to the input received from the one or more motion sensors 360a. The dynamic/static region adjustment module 740 then determines whether such region in the dynamic portion of the scene is or is not identified in the input received from the one or more motion sensors 360a, e.g., sensed as being in motion. If the region in the dynamic portion of the scene is in motion according to the input received from the one or more motion sensors 360a, processing continues to a Step 744. Otherwise, processing continues to a Step 743, in which the dynamic/static region adjustment module 740 moves such region from the dynamic portion of the scene to the static portion of the scene.

In Step 744, the dynamic/static region adjustment module 740 may optionally determine whether such region in the dynamic portion of the scene is within close proximity to the one or more presence sensors 365a, e.g., within the second predetermined threshold distance. If the region in the dynamic portion of the scene is within close proximity according to the input received from the one or more presence sensors 365a, processing may continue to Step 746. Otherwise, processing may continue to a Step 745, in which the dynamic/static region adjustment module 740 moves such region from the dynamic portion of the scene to the static portion of the scene. Step 744 is described as optional because not all implementations may want to make the assumption that, because a particular dynamic region is not within close proximity to the one or more presence sensors, it should no longer be considered part of the dynamic portion of the scene. In other words, in some embodiments, motion far from the presence sensors of the endpoint may be just as relevant to the determination of the proper "dynamic" regions of the captured scene as scene motion that is closer to the presence sensors of the endpoint.

After completion of the Steps 743 and 745, and if the dynamic/static region adjustment module 740 determines in Step 744 (if it is executed) that the region is in close proximity, e.g., within the second predetermined threshold distance, to the one or more presence sensors 365a, processing proceeds to the Step 746. In the Step 746, the dynamic/static region adjustment module 740 determines whether all regions of the captured image have been analyzed. If they have not, processing returns to the Step 741 and a further region of the captured video image is analyzed. Otherwise, the dynamic/static region adjustment module 740 stores the adjusted dynamic and static regions of the captured video image in the primary storage 380a in Step 747, and the dynamic/static region adjustment process is thereby complete.

Returning to FIG. 7A, the dynamic/static region exposure adjustment module 750 may then adjust the exposure settings of the camera 220a to properly expose the dynamic region(s) of the video image and/or separately to properly perform a high dynamic range exposure of the static region(s) of the video image at the same time (or at a later time than) the video sensor 320a captures the properly-exposed video image of the dynamic region(s). The adjusted, properly exposed dynamic regions of the image may then be composited onto the adjusted, properly HDR-exposed static regions of the image by HDR logic module 755 to create a single, composite high dynamic range image, and then optionally stored in the primary storage 380a and/or encoded by the video subsystem 770 in accordance with the audio and video codecs 375a and exported, e.g., in the form of an image or video stream having a high dynamic range.

The software frameworks 600 and 700 may be implemented in an endpoint 130a that is used in a setting in which the camera 220a is stationary. In such a setting, because the camera 220a is stationary, the static region, e.g., the background of the scene, may not change significantly over time, as it is also stationary. Thus, the method 500 may only test to see whether the static region of the scene has changed beyond a threshold amount on a periodic basis, e.g., every 5 or 10 minutes, in order to identify and capture a properly-exposed HDR representation of said static region of the scene and to store it in the primary storage 380a. E.g., the Sun setting outside an open window inside a conference room may slowly change the lighting within the captured scene over the course of several hours. In other embodiments, the test of the static region for a threshold amount of change from a previous capture (i.e., Step 580) may be performed more frequently, up to and including for each captured image frame.

In another exemplary embodiment, when the camera 220a is not being actively used to capture video images of the scene (i.e., is a "dormant" camera), e.g., when another camera of the endpoint 130a is being used to capture video images of the scene for transmission to the other endpoints of the system 100, 100', the camera 220a may be "learning" the static or background regions of the scene, e.g., by monitoring changes in scene composition or brightness levels over time in the static regions of the scene. When the camera 220a begins actively capturing video images of the scene again, the region definitions and corresponding exposure settings determined for the various regions while the device was not actively capturing video images for transmission may be utilized for the initially captured video images of the scene, subject to the adjustments determined by the region adjustment module 640/740 and/or the region exposure adjustment module 650/750.

Figure 8A:
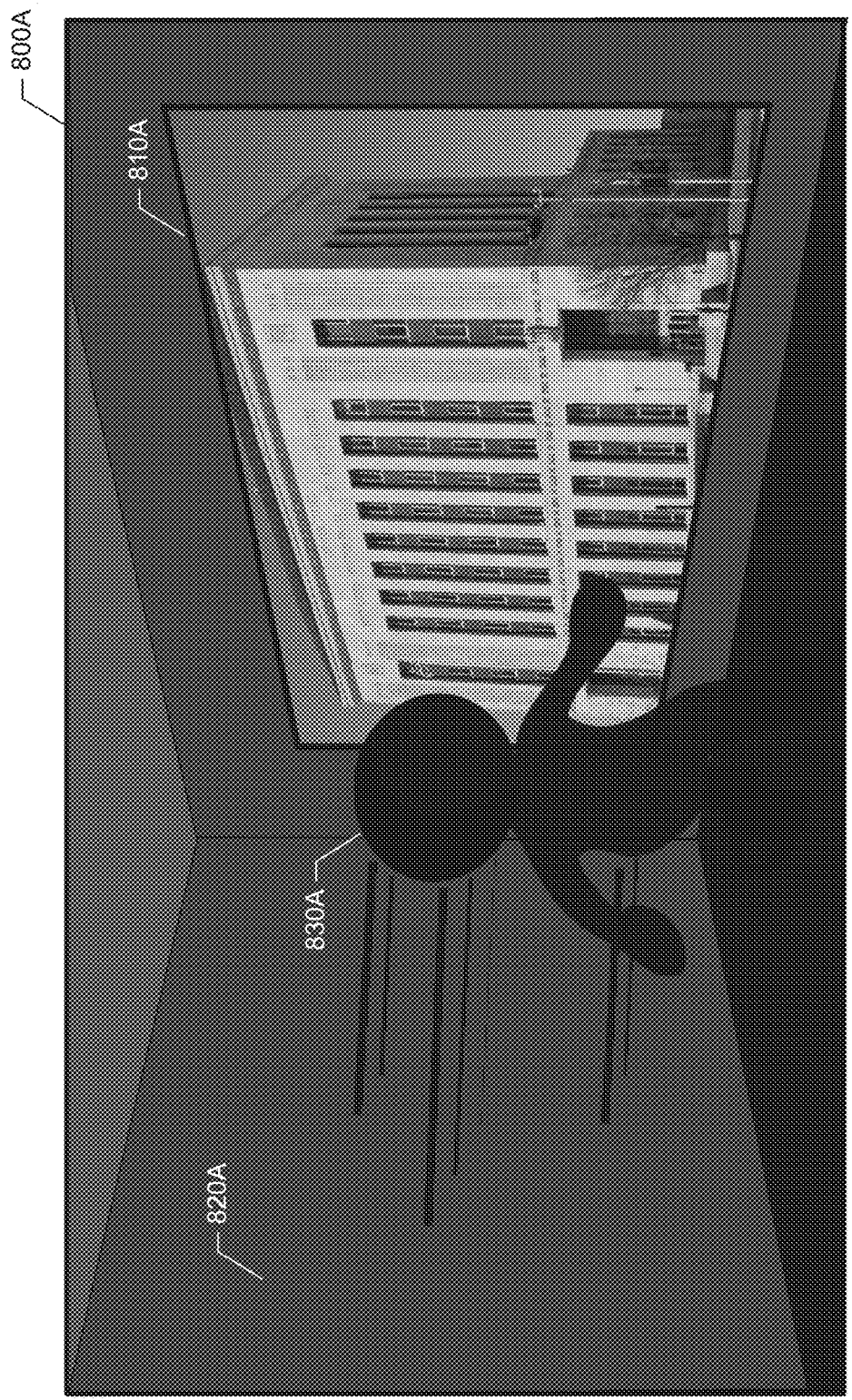
FIG. 8A illustrates a captured video image of a scene taken using a first exposure level, in accordance with the teachings of the prior art.

Illustrated in FIG. 8A is a first exemplary captured video image 800A of a scene, in accordance with an exemplary embodiment disclosed herein. The exemplary video image 800A was captured by the camera 220a using a first exposure level to properly expose region 810A (i.e., an open window showing a building across the street from the room being captured) of captured scene 800A. The remaining regions 820A (i.e., the wall, ceilings, and floor of the room) and 830A (i.e., a human subject walking across the room) of the captured scene appear underexposed when captured with the camera's exposure settings optimized for regions 810A (which, in this case, is an open window that is brighter than the rest of the surrounding environment).

Figure 8B:
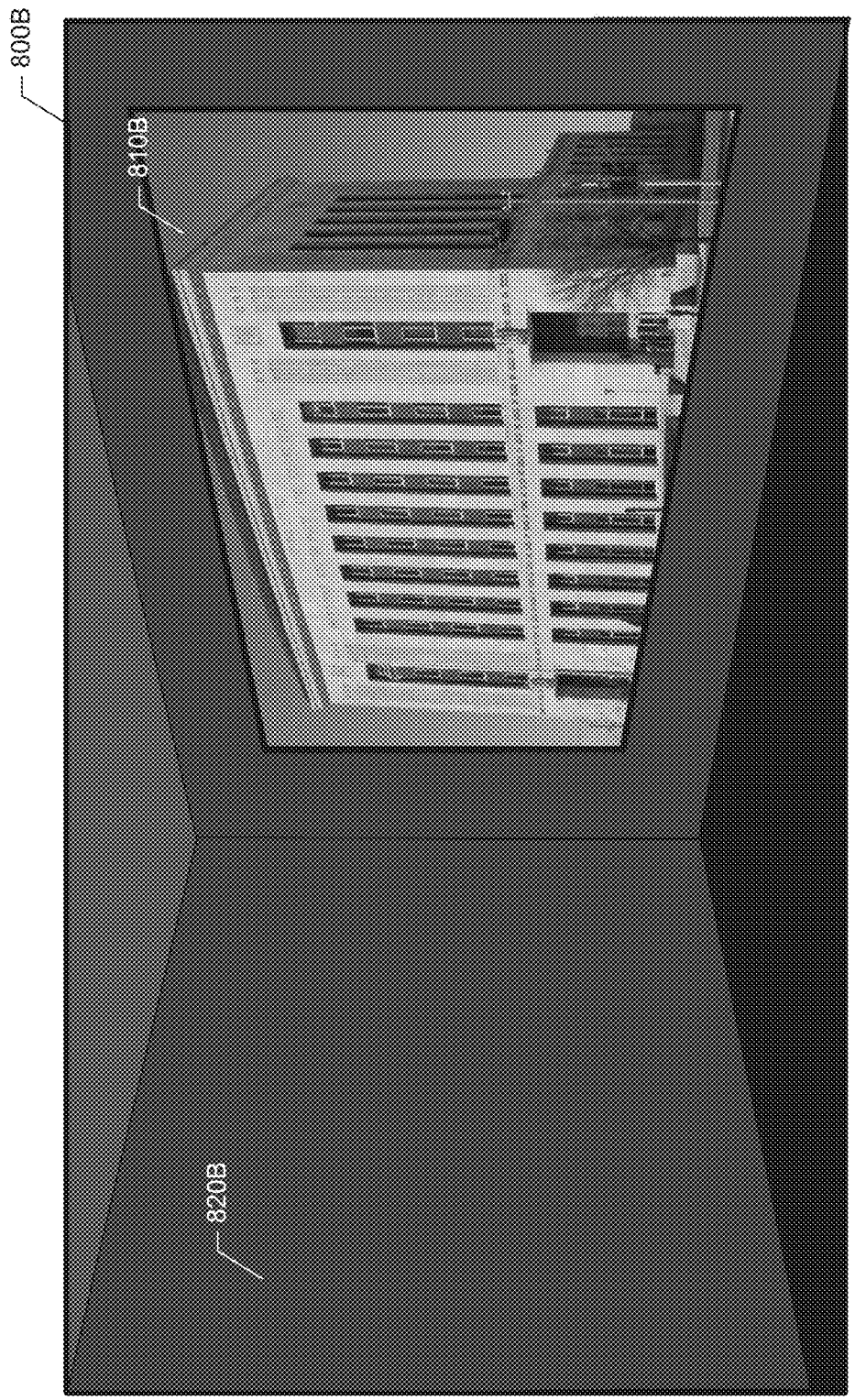
FIG. 8B illustrates a captured video image of the static regions of a scene taken using a first exposure level, in accordance with an exemplary embodiment disclosed herein.

Illustrated in FIG. 8B is a second exemplary captured video image 800B of the static regions of the same scene corresponding to the captured video image 800A, in accordance with an exemplary embodiment described herein. The video image 800B was captured by the camera 220*a* using the first exposure level to properly expose region 810B of the captured video image 800B, which happens to correspond to the more brightly-lit portions of the static region of the scene. Area 820B of the scene appears underexposed when captured with the camera's exposure settings optimized for region 810B. The dynamic region of the scene (i.e., human subject 830A) is not illustrated in FIG. 8B, as FIG. 8B only shows the static regions of the scene. As may now be appreciated, the areas 810B and 820B of the video image 800B correspond to the areas 810A and 820A of the video image 800A, respectively.

Figure 8C:
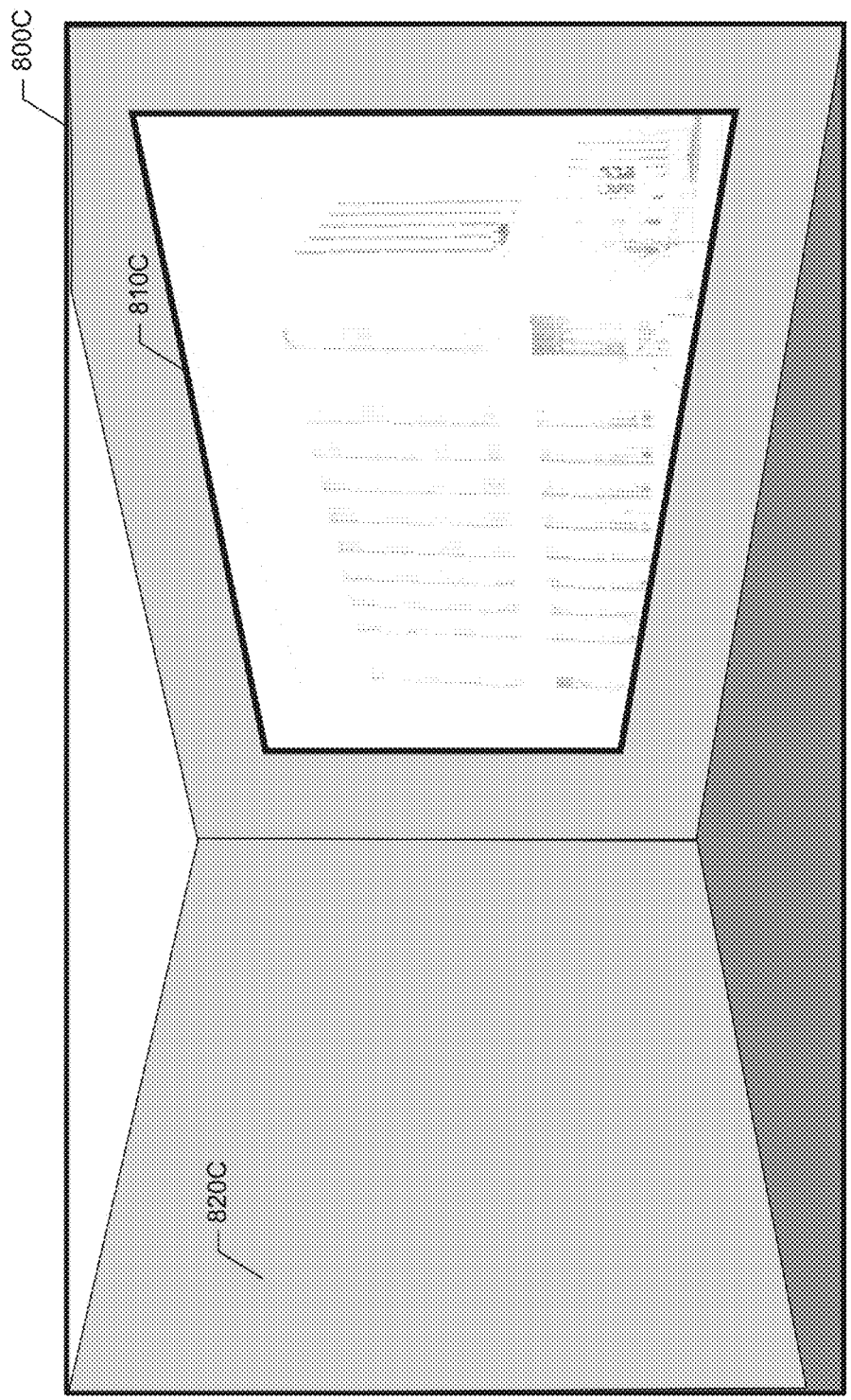
FIG. 8C illustrates a captured video image of the static regions of a scene taken using a second exposure level, in accordance with an exemplary embodiment disclosed herein.

Illustrated in FIG. 8C is a third exemplary captured video image 800C of the static regions of the same scene corresponding to the captured video image 800A, in accordance with an exemplary embodiment described herein. The video image 800C was captured by the camera 220*a* using a second exposure level to properly expose region 820C of the captured video image 800C, which happens to correspond to the more dimly-lit portions of the static region of the scene. Area 810C of the scene appears overexposed when captured with the camera's exposure settings optimized for region 820C. The dynamic region of the scene (i.e., human subject 830A) is again not illustrated in FIG. 8C, as it is meant to only show the static regions of the scene. As may now be appreciated, the areas 810C and 820C of the video image 800C correspond to the areas 810A and 820A of the video image 800A, respectively.

Figure 8D:
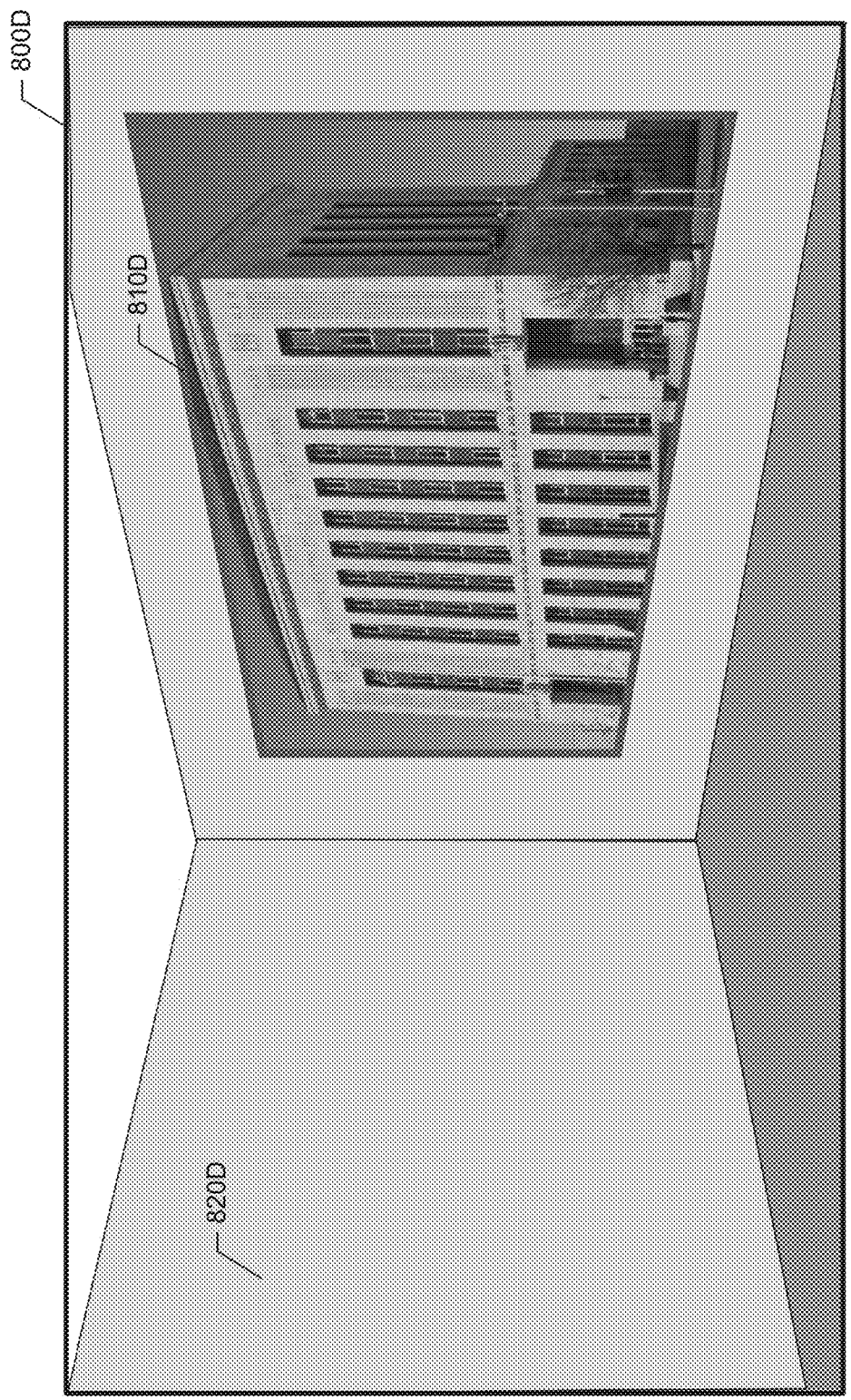
FIG. 8D illustrates a high dynamic range representation of the captured video image of the static regions of a scene taken using portions of the scene captured at a first exposure level and portions of the scene captured at a second exposure level, in accordance with an exemplary embodiment disclosed herein.

Illustrated in FIG. 8D is an exemplary high-dynamic range image 800D of the static portion of the scene, in accordance with an exemplary embodiment. The image 800D may be constructed, e.g., by the HDR logic module 655/755 combining portion 810B of the video image 800B with portion 820C of video image 800C, i.e., merging each of the properly-exposed regions of the scene stored in the primary storage 380*a*. As seen in FIG. 8D, areas 810D and 820D of the image 800D are each properly-exposed in the resultant HDR image 800D of the static regions of the scene. In some embodiments, the identified static regions within a captured scene may comprise the entire field of view of the captured scene, i.e., the entire width and the entire height of the image that will be stored and/or transmitted by the end point, while, in other embodiments, one or regions of the scene may comprise dynamic regions of the scene, in which case the source pixels for the dynamic regions in the resultant composite high dynamic range image may be pulled from an image(s) taken with default or optimized exposure settings for each respective said dynamic region. In still other embodiments, a video stream of a captured scene may go through periods of time where only a single static region is identified (e.g., where the scene is composed of all static objects, or all background objects, or all objects having roughly the same average brightness). In such cases, traditional HDR image capture techniques may be employed to capture an HDR representation of the scene, and the method may simply periodically sample the scene to determine if and when multiple dynamic regions are detected that may benefit from individual optimal exposure and reassembly into a single composite high dynamic range image.

Figure 8E:
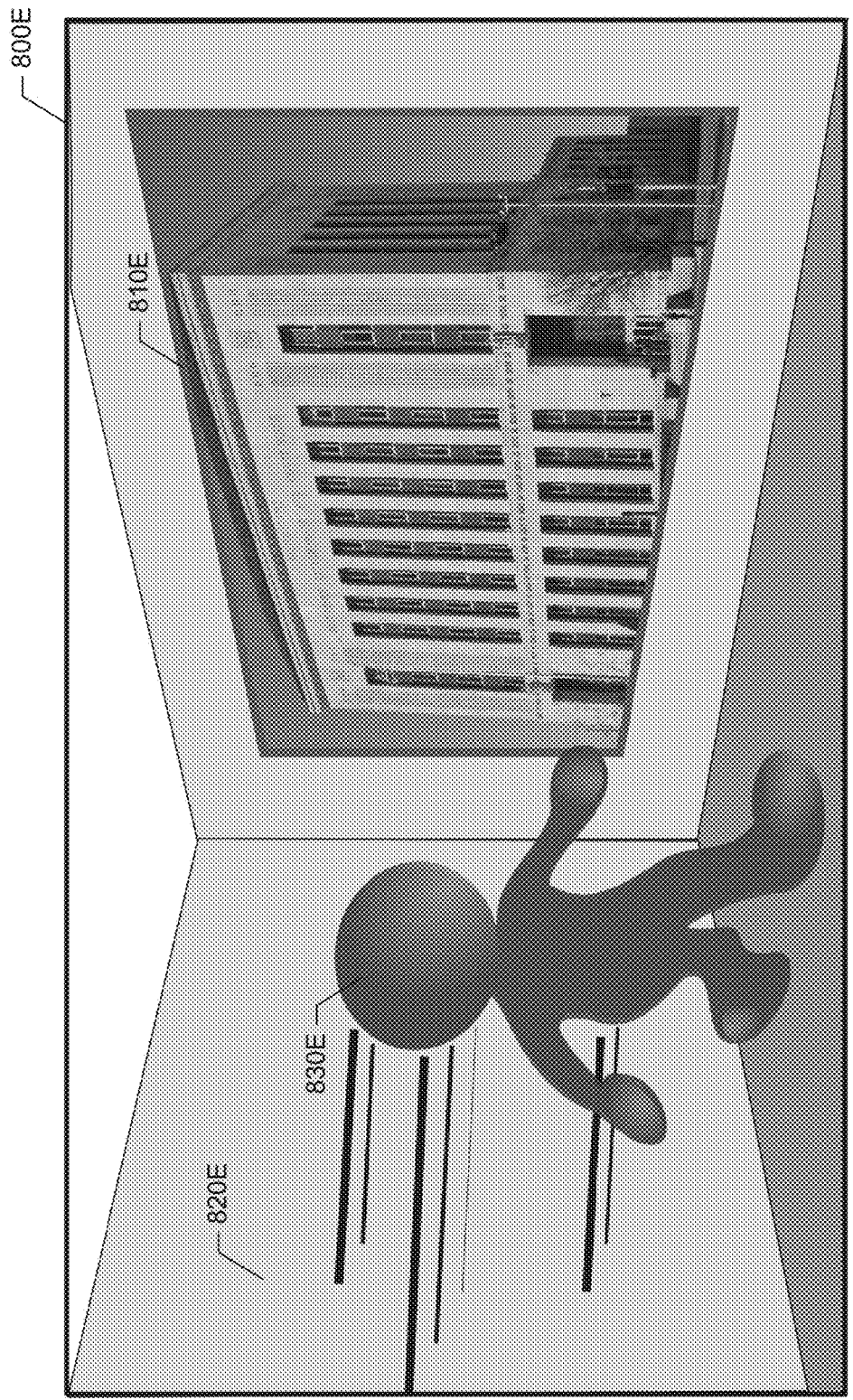
FIG. 8E illustrates a composited high dynamic range video image produced by compositing an optimally-exposed representation of the dynamic portions of the scene onto the high dynamic range representation of the static regions of a scene, in accordance with an exemplary embodiment disclosed herein.

Turning now to FIG. 8E, a composited high dynamic range video image 800E, produced by compositing an optimally-exposed representation of the dynamic portions of the scene onto the high dynamic range representation of the static regions of a scene is illustrated, in accordance with an exemplary embodiment disclosed herein. As discussed above with reference to FIG. 8D, regions 810E and 820E comprise the static portions of the captured scene that have been combined into a properly-exposed HDR capture. Region 830E represents a dynamic region in the scene, i.e., a human subject walking across the room. In the example of FIG. 8E, for the moment in time represented by video image 800E, the camera 220*a* may be used to capture an optimally-exposed representation of human subject 830E, which may, in turn, be composited on top of the properly-exposed HDR capture of regions 810E and 820E (also represented as regions 810D and 820D in FIG. 8D), which may, e.g., have been captured at an earlier moment in time, such as a time before human subject 830E had walked into the scene. As may now be appreciated, human subject 830E remains properly exposed, even as he moves across a high dynamic range scene, with only a single image of the scene being captured for a given moment in time.

Figure 8F:
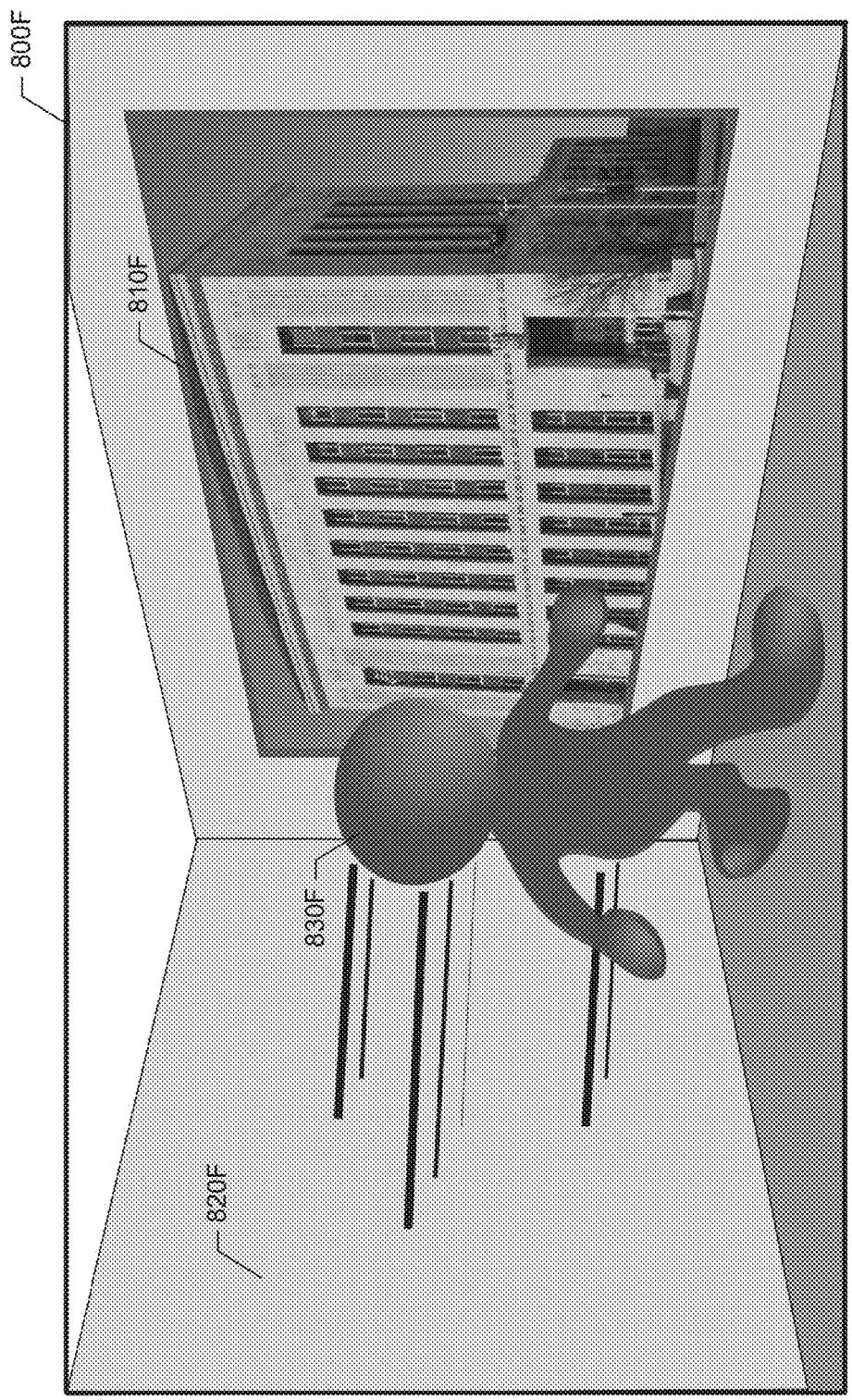
FIG. 8F illustrates a composited high dynamic range video image produced by compositing an optimally-exposed representation of the dynamic portions of the scene, which are located at a different position within the scene than they are in FIG. 8E, onto the high dynamic range representation of the static regions of a scene, in accordance with an exemplary embodiment disclosed herein.

Turning now to FIG. 8F, a composited high dynamic range video image 800F, produced by compositing an optimally-exposed representation of the dynamic portions of the scene onto the high dynamic range representation of the static regions of a scene is illustrated, in accordance with an exemplary embodiment disclosed herein. As discussed above with reference to FIG. 8D, regions 810E and 820E comprise the static portions of the captured scene that have been combined into a properly-exposed HDR capture. Dynamic region 830F in FIG. 8F represents an updated position of the location of the dynamic region in the scene, i.e., the human subject walking across the room, as compared to the position of the dynamic region 830E in FIG. 8E. In particular, the human subject has moved to in front of the open window in the scene between the capture of video image 800E of FIG. 8E and video image 800F of FIG. 8F. Traditionally, moving in front of an open window would result in human subject 830F become greatly underexposed, e.g., due to the lens of the camera calibrating its exposure settings based on the much brighter open window. However, as may now be more fully understood, human subject 830F is able to remain properly exposed, even as he moves across differently-lit portions of a high dynamic range scene, with only a single image of the scene being captured for any given moment in time, owing to the fact that the HDR representation of the static region of the scene that he will be composited onto was captured at a different time and/or by a different camera(s) not used to capture the optimally-exposed representation of human subject 830F.

Although exemplary embodiments of the method 500 are described herein as providing a video stream having a high dynamic range, it is to be understood that the method 500 may also be used for providing one or more individual video images, each having a high dynamic range. Thus, in such embodiments, the method 500 may be used for combining multiple identified, exposure-adjusted dynamic regions of a captured scene onto an HDR representation of the static regions of the scene, in order to provide an improved composite HDR image.

These and other advantages of the present disclosure will be apparent to those skilled in the art from the foregoing specification. Accordingly, it is to be recognized by those skilled in the art that changes or modifications may be made to the above-described embodiments without departing from the broad inventive concepts of this disclosure. It is to be understood that the inventions disclosed herein are not limited to the particular embodiments described herein, but are intended to include all changes and modifications that are within the scope and spirit of the inventions.

What is claimed is:

1. A method, comprising:
segmenting a scene into one or more static regions and one or more dynamic regions;
capturing a first video image of the one or more static regions of the scene at a first exposure level;
capturing a second video image of the one or more static regions of the scene at a second exposure level;
combining at least a portion of the first captured video image with at least a portion of the second captured video image to provide a high dynamic range video image of the one or more static regions of the scene;
capturing a third video image of at least one of the one or more dynamic regions of the scene at a third exposure level; and
compositing the third video image onto the high dynamic range video image of the one or more static regions of the scene to form a composite high dynamic range image.

2. The method of claim 1, wherein:
at least one of the one or more static regions comprises a background region of the scene.

3. The method of claim 1, further comprising:
moving at least a portion of the one or more static regions of the scene to the one or more dynamic regions of the scene; or
moving at least a portion of the one or more dynamic regions of the scene to the one or more static regions of the scene.

4. The method of claim 1, wherein:
the first exposure level is lower than the second exposure level; and
the first exposure level and second exposure level are configured to provide a high dynamic range capture of the one or more static regions of the scene at a first moment in time.

5. The method of claim 1, wherein:
the third exposure level is configured to provide an optimal exposure of at least one of the one or more dynamic regions of the scene.

6. The method of claim 1, wherein:
the first video image and the second video image are each captured at a different moment in time than the third video image is captured at.

7. The method of claim 1, wherein:
the first video image and the second video image are captured with a first camera; and
the third video image is captured with a second camera.

8. The method of claim 1, further comprising:
capturing a fourth video image of at least one of the one or more dynamic regions of the scene at a fourth exposure level; and
compositing the fourth video image onto the high dynamic range video image of the one or more static regions of the scene,
wherein the third video image and the fourth video image capture different dynamic regions of the scene,
wherein the third video image is captured with a first camera, and
wherein the fourth video image is captured with a second camera.

9. An apparatus for providing a high dynamic range video image of a scene, comprising:
one or more video sensors for:
capturing a first video image of the scene at a first exposure level;
capturing a second video image of the scene at a second exposure level; and
capturing a third video image of the scene at a third exposure level; and
a processing unit programmed with software instructions that when executed by the processing unit cause the processing unit to:
segment the scene into one or more static regions and one or more dynamic regions, wherein the first video image comprises a capture of one or more static regions of the scene, wherein the second video image comprises a capture of the one or more static regions of the scene, and wherein the third video image comprises a capture of one or more dynamic regions of the scene;
combine at least a portion of the first captured video image with at least a portion of the second captured video image to provide a high dynamic range video image of the one or more static regions of the scene; and
composite the third video image onto the high dynamic range video image of the one or more static regions of the scene to form a composite high dynamic range image.

10. The apparatus of claim 9, wherein the software instructions, when executed by the processing unit, further cause the processing unit to:
identify that at least one of the one or more static regions comprises a background region of the scene.

11. The apparatus of claim 9, wherein the software instructions, when executed by the processing unit, further cause the processing unit to:
move at least a portion of the one or more static regions of the scene to the one or more dynamic regions of the scene; or
move at least a portion of the one or more dynamic regions of the scene to the one or more static regions of the scene.

12. The apparatus of claim 9, wherein:
the first exposure level is lower than the second exposure level; and
the first exposure level and second exposure level are configured to provide a high dynamic range capture of the one or more static regions of the scene at a first moment in time.

13. The apparatus of claim 9, wherein:
the third exposure level is configured to provide an optimal exposure of at least one of the one or more dynamic regions of the scene.

14. The apparatus of claim 9, wherein the software instructions, when executed by the processing unit, further cause the processing unit to:
capture the first video image and the second video image at a different moment in time than the third video image is captured.

15. The apparatus of claim 9, wherein:
the first video image and the second video image are captured with a first video sensor; and the third video image is captured with a second video sensor.

16. The apparatus of claim 9, wherein the software instructions, when executed by the processing unit, further cause the processing unit to:

initiate a capture of a fourth video image of at least one of the one or more dynamic regions of the scene at a fourth exposure level; and composite the fourth video image onto the high dynamic range video image of the one or more static regions of the scene, wherein the third video image and the fourth video image capture different dynamic regions of the scene, wherein the third video image is captured with a first video sensor, and wherein the fourth video image is captured with a second video sensor.

17. A non-transitory program storage device, readable by a programmable control device, comprising instructions stored thereon that, when executed, cause the programmable control device to:

segment a scene into one or more static regions and one or more dynamic regions;

initiate a capture of a first video image of the one or more static regions of the scene at a first exposure level;

initiate a capture of a second video image of the one or more static regions of the scene at a second exposure level;

combine at least a portion of the first captured video image with at least a portion of the second captured video image to provide a high dynamic range video image of the one or more static regions of the scene;

initiate a capture of a third video image of at least one of the one or more dynamic regions of the scene at a third exposure level; and composite the third video image onto the high dynamic range video image of the one or more static regions of the scene to form a composite high dynamic range image.

18. The non-transitory program storage device of claim 17, wherein:

at least one of the one or more static regions comprises a background region of the scene.

19. The non-transitory program storage device of claim 17, further comprising instructions stored thereon that, when executed, cause the programmable control device to:

move at least a portion of the one or more static regions of the scene to the one or more dynamic regions of the scene; or move at least a portion of the one or more dynamic regions of the scene to the one or more static regions of the scene.

20. The non-transitory program storage device of claim 17, wherein:

the first exposure level is lower than the second exposure level; and the first exposure level and second exposure level are configured to provide a high dynamic range capture of the one or more static regions of the scene at a first moment in time.

21. The non-transitory program storage device of claim 17, wherein:

the third exposure level is configured to provide an optimal exposure of at least one of the one or more dynamic regions of the scene.

22. The non-transitory program storage device of claim 17, further comprising instructions stored thereon that, when executed, cause the programmable control device to:

initiate the captures of the first video image and the second video image at a different moment in time than the capture of the third video image is initiated.

23. The non-transitory program storage device of claim 17, wherein:

the first video image and the second video image are captured with a first video sensor; and; and the third video image is captured with a second video sensor.

24. The non-transitory program storage device of claim 23, further comprising instructions stored thereon that, when executed, cause the programmable control device to:

initiate a capture of a fourth video image of at least one of the one or more dynamic regions of the scene at a fourth exposure level; and composite the fourth video image onto the high dynamic range video image of the one or more static regions of the scene, wherein the third video image and the fourth video image capture different dynamic regions of the scene, wherein the third video image is captured with a first video sensor, and wherein the fourth video image is captured with a second video sensor.

* * * * *